United States Patent
Mueck et al.

(10) Patent No.: US 10,999,894 B2
(45) Date of Patent: May 4, 2021

(54) METHODS AND DEVICES FOR MANAGING ACCESS TO SHARED CHANNELS

(71) Applicant: Intel IP Corporation, Santa Clara, CA (US)

(72) Inventors: Markus Dominik Mueck, Unterhaching (DE); Ingolf Karls, Feldkirchen (DE); Christian Drewes, Germering (DE); Ziad Youssef, Duisburg (DE); Peter Jung, Duisburg (DE); Guido Bruck, Voerde (DE)

(73) Assignee: INTEL IP CORPORATION, Santa Clara, CA (US)

( * ) Notice: Subject to any disclaimer, the term of this patent is extended or adjusted under 35 U.S.C. 154(b) by 101 days.

(21) Appl. No.: 15/960,632

(22) Filed: Apr. 24, 2018

(65) Prior Publication Data

US 2018/0332660 A1 Nov. 15, 2018

(30) Foreign Application Priority Data

May 11, 2017 (DE) ................ 10 2017 110 242.6

(51) Int. Cl.
*H04W 88/12* (2009.01)
*H04W 48/10* (2009.01)
*H04W 74/08* (2009.01)
*H04W 76/18* (2018.01)
*H04W 16/14* (2009.01)

(52) U.S. Cl.
CPC ........... *H04W 88/12* (2013.01); *H04W 48/10* (2013.01); *H04W 74/0816* (2013.01); *H04W 76/18* (2018.02); *H04W 16/14* (2013.01)

(58) Field of Classification Search
CPC . H04W 76/18; H04W 88/12; H04W 74/0816; H04W 48/10; H04W 16/14; H04W 74/08; H04W 74/0808
See application file for complete search history.

(56) References Cited

U.S. PATENT DOCUMENTS

| | | | | |
|---|---|---|---|---|
| 2007/0268884 A1* | 11/2007 | Kolavennu | ........... | H04W 16/14 370/350 |
| 2015/0245374 A1* | 8/2015 | Mitola, III | ............ | H04W 16/14 370/329 |
| 2016/0183259 A1* | 6/2016 | Mueck | .................. | H04W 16/14 370/329 |
| 2017/0142592 A1* | 5/2017 | Fischer | ............. | H04W 72/1263 |
| 2017/0150520 A1* | 5/2017 | Soder | .................. | H04W 74/002 |
| 2019/0191314 A1* | 6/2019 | Mueck | ................ | H04W 52/243 |

OTHER PUBLICATIONS

Federal Communications Commission, Report and order and second further notice of proposed rulemaking, In the Matter of Amendment of the Commission's Rules with Regard to Commercial Operations in the 3550-3650 MHz Band, FCC 15-47, Apr. 2015.

* cited by examiner

Primary Examiner — Maharishi V Khirodhar
Assistant Examiner — Kenneth P Hunt
(74) Attorney, Agent, or Firm — Viering, Jentschura & Partner MBB

(57) ABSTRACT

A control node for operating in a network with shared channels includes one or more processors configured to execute program code to determine a rejection strategy for managing contention-based access to a shared channel by one or more transmitters, transmit or trigger transmission of a transmission request rejection in response to a transmission request by a first transmitter of the one or more transmitters according to the rejection strategy.

19 Claims, 15 Drawing Sheets

METHODS AND DEVICES FOR MANAGING ACCESS TO SHARED CHANNELS

CROSS-REFERENCE TO RELATED APPLICATIONS

This application claims priority to German Patent Application No. 10 2017 110 242.6, which was filed May 11, 2017, and is incorporated herein by reference in its entirety.

TECHNICAL FIELD

Various embodiments relate generally to methods and devices for managing access to shared channels.

BACKGROUND

Contention-based channel access schemes emerged as a popular choice for unlicensed radio communication protocols, including Wi-Fi and MulteFire. These contention-based channel access schemes are particularly useful in scenarios where different networks that do not have a common controlling entity are co-deployed in proximity to one another. As there is no common controlling entity to perform scheduling and allocation of resources, contention-based channel access schemes present an organized and controlled mechanism for competing transmitters to access a shared channel.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
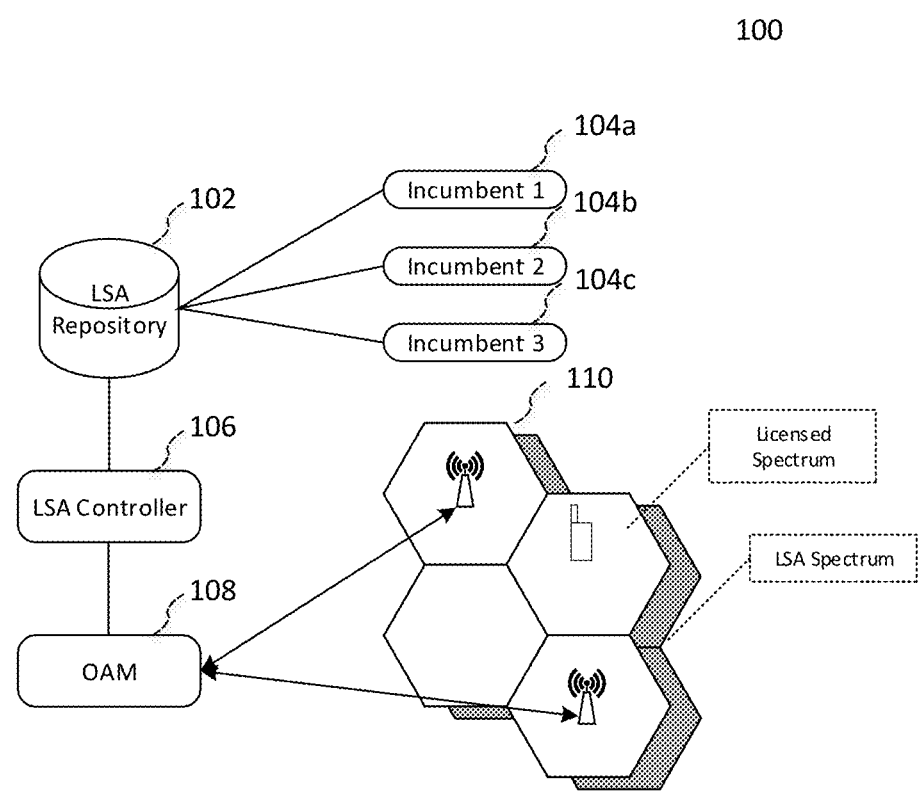
FIG. 1 shows an exemplary network architecture in accordance with a Licensed Shared Access (LSA) network according to some aspects.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

The terms "circuit" or "circuitry" as used herein are understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc.). Note that some bands are limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

For purposes of this disclosure, radio communication technologies may be classified as one of a Short Range radio communication technology or Cellular Wide Area radio communication technology. Short Range radio communication technologies include Bluetooth, WLAN (e.g. according to any IEEE 802.11 standard), and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g. according to an IEEE 802.16 radio communication standard, e.g. WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples. Furthermore, as used herein the term GSM refers to both circuit- and packet-switched GSM, i.e. including GPRS, EDGE, and any other related GSM technologies. Likewise, the term UMTS refers to both circuit- and packet-switched GSM, i.e. including HSPA, HSDPA/HSUPA, HSDPA+/HSUPA+, and any other related UMTS technologies.

The term "network" as utilized herein, e.g. in reference to a communication network such as a radio communication network, encompasses both an access section of a network (e.g. a radio access network (RAN) section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

The term "terminal device" utilized herein refers to user-side devices (both mobile and immobile) that can connect to a core network and various external networks via a radio access network. The term "network access node" as utilized herein refers to a network-side device that provides a radio access network with which terminal devices can connect and exchange information with other networks through the network access node.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of logical data over a software-level connection). For example, a processor may transmit or receive data in the form of radio signals with another processor, where the physical transmission and reception is handled by radio-layer components such as RF transceivers and antennas, and the logical transmission and reception is performed by the processor. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

In spectrum sharing schemes such as Licensed Shared Access (LSA, proposed mainly for Europe in the 2.3-2.4 GHz bands) and Spectrum Access System (SAS, proposed mainly in the U.S. for the 3.55-3.7 bands), Mobile Network Operators (MNOs) may be granted access to previously restricted radio frequency bands. Accordingly, an SAS or LSA "licensee" may license certain targeted frequency bands from "incumbents", and thus may be able to utilize the shared frequency bands. Licensees may be characterized as lower-tiered users, while incumbents may be characterized as higher-tiered users. Additionally, licensees such as GAA users may be characterized as lower-tiered users relative to PAL users.

While the targeted frequency bands for LSA and SAS may already be officially licensed and/or owned by the incumbents (mainly related to government use), the targeted frequency bands may be under-utilized over time and/or space. For example, the incumbents may utilize the targeted frequency bands relatively rarely, and/or may employ the targeted frequency bands only in certain areas. Accordingly, LSA and SAS propose a system in which the targeted frequency bands may be made available to cellular MNOs in scenarios (both geographically and temporally dependent) where the incumbent is not occupying the band. For example, one or more licensed MNOs may be granted access to the targeted frequency bands in scenarios where the incumbent is not actively occupying the targeted frequency bands, and accordingly may utilize the newly available bandwidth for mobile communications.

As indicated above, LSA has identified the 2.3-2.4 GHz frequency band (corresponding to 3GPP LTE Band 40) as a suitable candidate for spectrum sharing, and has additionally been the focus of proposals to also incorporate the 700 MHz and/or 3.6-3.8 GHz bands. Under the proposed LSA framework, a licensee (e.g. an MNO or any other entity that operates a wireless network) may operate a 3GPP LTE network on licensed shared basis, where a licensee may engage in a multi-year sharing contract with an incumbent (such as e.g. 10 years or more). As incumbents maintain prioritized access of the targeted LSA band over all licensees, any licensee may be required to vacate the targeted LSA band for a given geographic area, given frequency range, and given period of time during which an incumbent is accessing the targeted LSA band.

FIG. 1 shows block diagram 100 illustrating an LSA network architecture. As shown in FIG. 1, LSA spectrum management may rely on a centralized LSA Repository 102. Incumbents 104a-104c may be required to provide a-priori usage information to LSA repository 102 on the availability of LSA spectrum on a time- and geographic-basis. Depending on the indicated usage information, an LSA controller 106 may employ control mechanisms to grant/deny spectrum access to the incumbents 104a-104c and issue commands to vacate concerned bands. In the current proposed operational approach for LSA, sensing mechanisms may not be required to support the system for identification of incumbent operation. Accordingly, in many cases users may not need to perform sensing to detect incumbent usage; however, this may potentially be adapted in future proposals.

LSA repository 102 may be a central control entity that falls outside of the domain of the MNOs and may interface with the incumbents 104a-104c. In the context of LSA, these incumbents 104a-104c may include wireless cameras (which are allocated spectrum in the targeted LSA band in Europe). Each LSA controller 106 (where each MNO network 110 may include one or more LSA controllers) may thus interface with LSA repository 102 in order to access the a-priori information provided by the incumbents 104a-104c. As shown in FIG. 1, LSA controller 106 may interface with the Operations, Administration, and Management (OAM) framework 108 of the MNO network 110 in order to provide information on the availability of the shared spectrum to the relevant MNO network components including base stations and end user terminals.

Similarly to LSA, proposed SAS arrangements may allow licensees to operate a 3GPP LTE network on the 3.55-3.7 GHz frequency band on a shared basis with an incumbent. However, as opposed to the two-tier system between incumbent and licensee (tier-2 and tier-2, respectively) in LSA, SAS additionally proposes a third tier (tier-3) composed of General Authorized Access (GAA) users. In this three-tier system, tier-2 users, or "Priority Access License" (PAL) users, may only be allocated a limited portion of the entire SAS band (e.g. the PAL spectrum with to 70 MHz bandwidth) in the absence of an incumbent. The remaining spectrum, in addition to any unused portions of the PAL spectrum, may be allotted to GAA users which may typically employ the available tier-3 spectrum for LTE Licensed Assisted Access (LSA) or WiFi-type systems.

Figure 2:
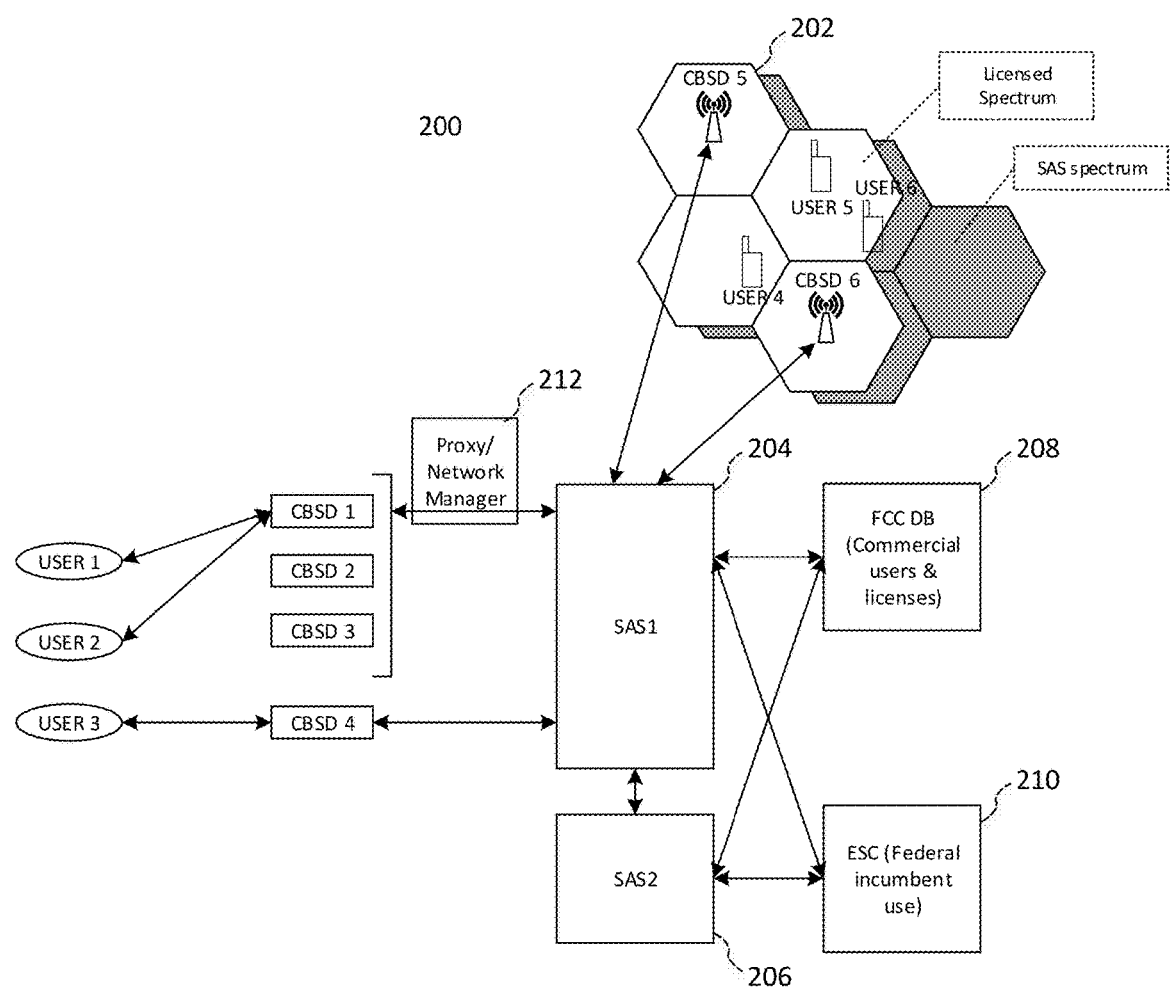
FIG. 2 shows an exemplary network architecture in accordance with a Spectrum Access System (SAS) network according to some aspects.

FIG. 2 shows block diagram 200 illustrating an SAS network architecture. In contrast to LSA, SAS may be designed to ensure coexistence between incumbents that are not able to provide any a-priori information to a centralized database. As indicated above, SAS may employ a three-tiered system composed of incumbents (tier-1), PAL users (tier-2), and GAA users (tier-3). SAS incumbent users may thus be the highest tier and may generally be protected from interference from the lower-tier PAL and GAA users. Such SAS incumbent users may conventionally be federal or military-related, such as Department of Defense (DoD) radars, and may also include other wireless systems such as Fixed Satellite Service (FSS) stations and certain grandfathered terrestrial wireless systems. PAL users (which may include MNOs) may license 10 MHz bands in certain geographic areas (census tracts) and may receive interference protection from GAA users while accepting certain levels of interference from incumbent users. As incumbents are expected to be protected from interference from all lower-tier users, PAL users may be required to vacate the licensed band in certain scenarios where incumbent users wish to utilize the licensed band (where the specifics and frequency of such scenarios may depend on the particulars of each license). As the lowest-tier (tier-3), GAA users may not receive any interference protection (thus accepting interference from both PAL and incumbent users) and may similarly face vacation scenarios in order to protect incumbent users.

As shown in FIG. 2, SAS systems may additionally include an Environmental Sensing Capability (ESC) entity 210, which may be employed in order to protect incumbent users from interference from PAL and GAA users. Such ESC entities 210 may be composed of a sensor network to detect radio activity by incumbent users, such as e.g. detecting radio activity by military radar, which may allow SAS controller 210 to instruct PAL and GAA users to cease transmissions on the shared spectrum and/or re-allocate transmission to a different portion of the shared spectrum in order to protect active incumbents.

Accordingly, SAS networks may include one or more SAS controllers (e.g. SAS1 204 and SAS2 206 as shown in FIG. 2) which may interact with licensee users (GAA and PAL) in order to facilitate spectrum sharing while guaranteeing interference protection to higher-tiered users from lower-tiered users. Each SAS controller may thus interact with the network architectures of the licensee users, such as licensee network 202. As shown in FIG. 2, a SAS controller may interact with a single licensee transmitter (e.g. CBSD4) or with a network of licensee transmitters (e.g., CBSD1-CBSD3) via a proxy/network manager entity 212, which may act as an interface between SAS controller 204 and the various network components of a given MNO's network, such as CSBD1-CSBD3 and USER1 and USER2. Each radio access network transmitter, such as base stations or small cells, which are referred to as Citizens Broadband Radio Service Devices (CBSD) in the context of SAS, may thus be able to transmit wireless signals to end users (such as USER1, USER2, and USER3 as shown in FIG. 2) according to the shared spectrum access permitted by the corresponding SAS controller. SAS controllers 204 and 206 may aim to ensure that both the CBSDs (e.g., base stations and small cells) and end users (e.g., terminal devices) do not cause excessive interference to incumbent users, which the SAS framework may enforce by specifying certain maximum permitted transmit power levels for CBSDs and end user terminals. SAS controllers 204 and 206 may also interface with an FCC Database 208, which may store information detailing the commercial users and licenses.

Both LSA and SAS may additionally provide Quality of Service (QOS) guarantees to licensees, where a licensee that is granted access to a particular frequency band may be guaranteed a certain QOS level. LSA and SAS also resolve congestion problems through central coordination, such as preventing over-utilization of the targeted frequency bands by incumbents and/or other MNOs at a given time at a central control entity. As previously detailed regarding FIGS. 1 and 2, LSA and SAS systems may employ an LSA controller (e.g., LSA controller 106) and SAS controller (e.g., SAS controllers 204 and 206), respectively, to coordinate access between incumbents and secondary users (e.g., registered licensees). Accordingly, these central control entities may grant secondary users access to LSA and SAS spectrum, which may be on an exclusive basis. Secondary users may therefore enjoy dedicated access to the additional spectrum available through LSA and SAS for a given period of time and in a given geographic area.

As access to LSA and SAS spectrum may be situation-dependent (i.e. time and geographic dependent), shared spectrum may be appropriate for use in a "supplemental" role. For example, given the variable availability of shared spectrum, it may be impractical (albeit possible) in many scenarios to realize a comprehensive wireless network entirely on shared spectrum. However, licensee MNOs may be able to utilize dedicated licensed spectrum (i.e. exclusively licensed by a licensee) in a primary role while allocating shared spectrum for supplemental uplink and/or downlink. Licensee MNOs may thus be able to rely on the constant availability of dedicated licensed spectrum while utilizing shared spectrum to increase bandwidth when the shared spectrum is available.

While incumbent and PAL transmitters in SAS networks may not face competition with other transmitters to access shared spectrum channels, GAA transmitters may be expected to use a contention-based protocol when accessing GAA channel. For example, while there may be multiple GAA channels available, a given GAA transmitter may be expected to contend for a GAA channel with other transmitters, such as by sensing the channel to determine that it is free (e.g., that no other transmitters are transmitting) before starting a transmission. This procedure of sensing the channel before transmitting, generalized as "listen-before-talk", can therefore help in avoiding collisions while enabling multiple different transmitters to share a channel without centralized coordination.

Although not yet standardized, listen-before-talk schemes such as carrier sense multiple access with collision avoidance (CSMA/CA) have been proposed as potential contention-based protocols for governing access to GAA channels. In a CSMA/CA scheme, multiple transmitters may perform carrier sensing to determine whether and when they are permitted to access a radio channel. For example, a first transmitter may have pending data scheduled for transmission to a receiver. As multiple transmitters may share the channel, the first transmitter may perform carrier sensing to determine whether the channel is 'busy', such as whether another transmitter is currently transmitting on the channel. The first transmitter may therefore listen to the channel for a predefined sensing window (e.g., a Distributed Coordination Function (DCF) Inter-frame Space (DIFS)). If the first transmitter does not detect any transmissions during the sensing window, for example, if the channel is free, the first transmitter may immediately access the channel and transmit the pending uplink data. If the first transmitter detects transmissions during the sensing window, for example, if the channel is busy, the first transmitter may perform a 'backoff' procedure before attempting to transmit again. In such a backoff procedure the first transmitter may continue listening to the channel to determine when the detected transmission ends. Once the detected transmission ends, the first transmitter may listen to the channel for the duration of the sensing window. If the first transmitter detects another transmission during the sensing window, the first transmitter may again listen to the channel to determine when the detected transmission ends and continue listening to the channel for the duration of the sensing window.

If the first transmitter does not detect any further transmissions during the sensing window, the first transmitter may initiate a backoff counter (e.g., a randomly selected number of slots) and begin decrementing the backoff counter. Each time the first transmitter detects a transmission on the channel during the backoff counter, the first transmitter may pause the counter, wait until the detected transmission ends, listen for the duration of the sensing window, and continue the counter after a sensing window elapses following a detected transmission. When the backoff counter expires, the first transmitter may then access the channel and perform the transmission.

Transmitters operating in a CSMA/CA scheme may utilize certain techniques to detect other transmissions. For example, certain technologies may employ 'physical' carrier sensing and/or 'virtual' carrier sensing to detect transmissions during carrier sensing. In physical carrier sensing, a transmitter such as the exemplary first transmitter may monitor the channel by receiving channel data and processing the channel data (e.g., a Clear Channel Assessment (CCA)). In some aspects of physical carrier sensing, the first transmitter may perform energy detection (ED), which may involve determining whether the channel is busy based on the radio energy observed in the channel (which may be radio energy from other RATs, noise, interference, corrupted transmissions from the same RAT, etc.). If the observed radio energy is above a threshold, the first transmitter may determine that the channel is busy. As the first transmitter may only observe unattributed radio energy, the first transmitter may have to continue listening to the channel to determine when the channel is free, for example, when the observed radio energy falls below the threshold.

In some aspects of physical carrier sensing, the first transmitter may perform preamble detection, in which the first transmitter may process received channel data to determine if the channel contains any preambles (which may be RAT-specific preambles) transmitted by other transmitters of the same RAT. If the first transmitter detects a preamble, the first transmitter may determine that the channel is busy for the current frame (in contrast to ED, in which the first transmitter may need to continue listening to determine when the observed radio energy falls).

Communication nodes performing physical carrier sensing may therefore actively monitor and sample the channel to determine whether the channel is busy or not. As detailed above, in the preamble detection case a communication node such as the first transmitter may be able to determine that the channel is busy for the current frame if a preamble is detected (as the duration of the detected transmission may be deterministic). In the ED case, the first transmitter may continue monitoring the channel during the current frame if sufficient radio energy is observed (to determine when the radio energy falls below the threshold) as the duration of the detected transmission may not be deterministic. Physical carrier sensing may therefore only inform the first transmitter that the channel is busy for at most the current frame.

In virtual carrier sensing, communication nodes may be able to obtain more information about the duration of any detected transmissions. Specifically, communication nodes may in some cases use a transmission request-grant handshake procedure to reserve the channel for a duration of time, e.g., a reservation period. In these transmission request-grant handshake procedures (e.g., a Request to Send (RTS)/Clear to Send (CTS) sequence), a potential transmitter such as the first transmitter may transmit a transmission request (e.g., an RTS) to a network access node that contains a reservation period (e.g., a Network Allocation Vector (NAV)) for which the first transmitter wishes to reserve the channel to transmit a pending transmission. The network access node may receive the transmission request and, assuming the channel reservation is permitted, transmit a transmission grant (e.g., a CTS) to the first transmitter that also contains an updated reservation period that also counts for the time elapsed since the transmission request.

The first transmitter may then transmit the pending transmission to the network access node, which may respond with an acknowledgement (ACK) or non-acknowledgement (NACK) to signal whether the transmission was successfully received or not. In some aspects, the first transmitter and the network access node may utilize an ACK/NACK scheme, while in other aspects the first transmitter and the network access node may utilize an ACK-only scheme. In an ACK/NACK scheme, the receiving device may transmit either an ACK or a NACK depending on whether the transmission was successfully received. In an ACK-only scheme, the receiving device may transmit an ACK if the transmission was successfully received and may not transmit anything if the transmission was not successfully received. The transmitting device may therefore set a timer upon transmitting the transmission and, if the timer expires and no ACK has been received, may re-transmit the transmission (in other words, may treat the non-response as an implicit NACK). Both can be implemented into these aspects.

Any other transmitters that are listening to the channel during the transmission request-grant handshake procedure (and are capable of decoding the handshake messages) may receive the transmission request and transmission grant. As the reservation period and updated reservation period specify how long the transmission request-grant handshake procedure (which may include the duration of the transmission request, transmission grant, the transmission, and ACK/NACK response) will last, the other transmitters may read the reservation period from the transmission request and/or transmission grant and determine that the channel will be busy for the duration of the reservation period/updated reservation period (which may end at the same time). In accordance with virtual carrier sensing, the other transmitters may set and initiate a reservation counter (e.g., a NAV) equal to the reservation period/updated reservation period and assume that the channel will be busy until at least the reservation counter has expired. As the reservation period/updated reservation period may be multiple frames in length, transmitters operating with virtual carrier sensing may be able to determine that the channel will be busy for longer periods of time (relative to the maximum single frame of physical carrier sensing). The transmitters may therefore 'virtually' determine that the channel will be busy for the extra frames of the reservation period/updated reservation period without actively checking the channel during these extra frames. Additionally, other transmitters can set a reservation counter (e.g., a NAV) by decoding other signal components. For example, another transmitter may be able to detect a preamble and decode a packet length field of the preamble. The packet length field may indicate the length of the packet, which the other transmitter may determine and use to set the reservation counter as part of virtual sensing. There may accordingly be various different mechanisms by which transmitters can determine the length of a given transmission as part of virtual carrier sensing and use this information to set a reservation counter.

Furthermore, the use of transmission request-grant handshakes may solve the 'hidden node' problem. In the hidden node problem, a first transmitter and a second transmitter may be located on opposite sides of a node that the first transmitter is attempting to transmit to. While the node may be within range, and thus able to detect transmissions from, both transmitters, the second transmitter may be located too far from the first transmitter to successfully detect transmissions by the first transmitter. Accordingly, the first transmitter may be transmitting to the node when the second transmitter decides to attempt to transmit. Even if the second transmitter performs carrier sensing on the channel, the second transmitter will not be able to detect the ongoing transmission by the first transmitter, and therefore will incorrectly determine that the channel is free and begin performing its own transmission. This transmission will collide with the ongoing transmission by the first transmitter, thus corrupting both transmissions.

However, if the first transmitter first sends out a transmission request (e.g., RTS) to the node, the node may respond by transmitting a transmission grant (e.g., CTS). As the second transmitter is within range of the node, the second transmitter will detect the transmission grant during the sensing window and thus refrain from transmitting. The first transmitter can therefore, after receiving the transmission grant, begin its transmission to the node without the transmission being corrupted by a colliding transmission by the second transmitter.

These contention-based protocols and listen-before-talk techniques have been targeted for use by GAA transmitters, such as in the form of a MulteFire setup as proposed for future SAS deployments. Accordingly, a GAA transmitter that have pending data to transmit may first perform listen to the GAA channel to determine whether any other GAA transmitters are using the channel to transmit data, such as for the duration of a sensing window (e.g. DIFS). If no transmissions are detected during the sensing window, the GAA transmitter may determine that the channel is free and may proceed to transmit. If the GAA transmitter detects a transmission (e.g., by energy or preamble detection), the GAA transmitter may begin and complete the backoff procedure as described above before attempting to transmit its pending data. Similarly, if the GAA transmitter detects a transmission request-grant handshake procedure such as an RTS/CTS exchange, the GAA transmitter may delay for a period of time (e.g., a reservation period such as a NAV) before attempting to transmit its pending data.

GAA transmitters using a listen-before-talk protocol may therefore avoid collisions with each other while still being able to access the channel for transmissions. However, while the use of a distributed scheme as described above (in other words, where there is no central coordination) may be suitable for many use cases, high-congestion scenarios where many GAA transmitters are attempting to access the radio channel at the same time may prove problematic. For example, if many GAA transmitters are competing for the same channel at the same time, there may be an increased probability that a GAA transmitter with pending data will detect another transmission and thus have to wait to being transmitting. In cases with extremely high-congestion, GAA transmitters may have to wait for extended periods of time before being able to occupy the channel. This may degrade performance by reducing spectral efficiency and the data rate for each GAA transmitter over the GAA channel.

According to aspects of this disclosure, spectrum sharing networks (including but not limited to SAS) may utilize a central control node to govern transmissions by competing transmitters. For example, as SAS networks will already include a central control entity in the SAS controller, the SAS controller may oversee transmissions by competing GAA transmitters to alleviate congestion in the GAA spectrum. In various aspects of this disclosure, central control entities such as SAS controllers may be configured to transmit (or trigger transmission of) transmission request rejections in response to transmission requests sent by transmitters. As such transmission request rejections, or Reject Request to Send (RRTSs), may overrule any transmission grants, the central control entity may control which transmitters and when each transmitter can perform a transmission.

These aspects can provide distinct advances over distributed listen-before-talk schemes, in which each transmitter contends for the channel on an equal basis without any central control. As indicated above, the lack of central control may leave such schemes susceptible to degraded performance in high-congestion scenarios. In particular, transmitters may have to wait for excessive durations of time before being able to occupy the channel and, as no higher-level control is provided, may not have any immediate mechanism to alleviate these issues. In contrast, various aspects of this disclosure can use high-level control by a central control entity to manage access to the channel by transmitters. As will be detailed, this can include selectively transmitting (or triggering transmission of) transmission request rejections in response to transmission requests from certain transmitters in order to control which transmitters can access the channel at which times, such as by permitting only a first group of transmitters to access the channel during a first time period (e.g., by sending out transmission request rejections to transmission requests from all other transmitters) and permitting only a second group of transmitters to access the channel during a second time period (e.g., by sending out transmission request rejections to transmission requests from all other transmitters). Various other aspects can similarly manage channel access by other techniques such as randomly rejecting a percentage of transmission requests and identifying and restricting transmitters with high channel occupancy. According to various aspects described herein, the central control entity can thus better manage the channel and help to alleviate collisions through schemes of this nature.

Figure 3:
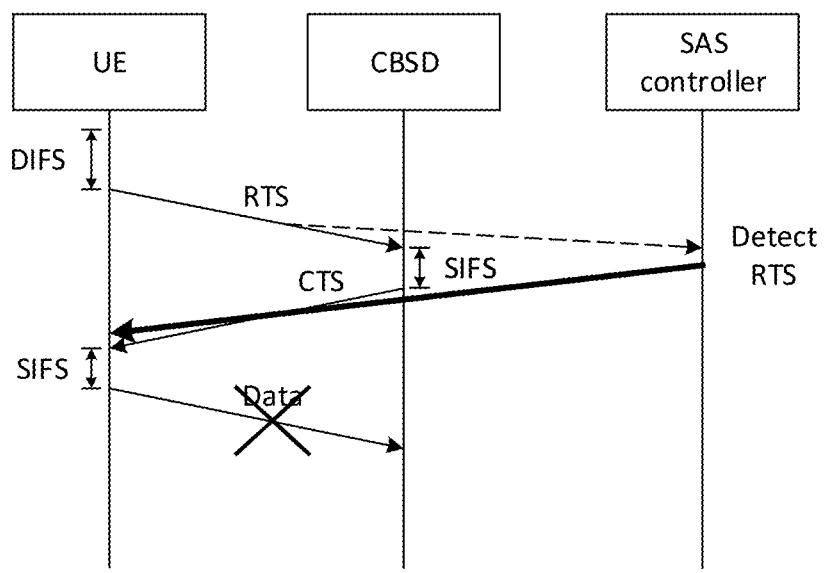
FIG. 3 shows an exemplary messages sequence chart illustrating transmission of a transmission request rejection according to some aspects.

FIG. 3 shows an exemplary diagram illustrating the use of RRTSs according to some aspects. As previously described in relation to FIG. 2, various CBSDs (such as base stations, access points, and other types of network access nodes) may be granted permission to use GAA channels in SAS spectrum, and accordingly may be able to transmit and receive data with terminal devices that are served by the CBSDs. As shown in FIG. 3, a SAS controller (e.g., SAS controller 204 or 206) may listen for RTSs sent by GAA transmitters, such as an RTS from a UE (e.g., any of USER1-USER6) to a CBSD (e.g., any of CSBD1-CBSD6) with which the UE intends to request permission from the CBSD to transmit data. The SAS controller may detect the RTS and decide that the UE should not be permitted to transmit the data. The SAS controller may therefore send an RRTS in response to the RTS.

Accordingly, even if the CBSD sends a CTS to the UE in response to the RTS, the RRTS from the SAS controller can overrule the CTS. The UE may therefore be configured to refrain from transmitting the data when an RRTS is received even if a CTS is also received. In the case of FIG. 3, the RRTS may arrive at the UE before the CTS, and the UE may therefore know that an RRTS has been received prior to receiving the CTS. In some aspects, the UE may also be configured to wait for predefined time after receiving an CTS to see if an RRTS will also be received and, if an RRTS is received, refraining from transmitting the data in response to the CTS. In some aspects, the UE may be configured to refrain from transmitting the data if an RRTS is received during the SIFS, while in other aspects the UE may be configured to wait for another predefined time period (different from the SIFS) to see if any RRTSs are received. The SAS controller may therefore be able to overrule CTSs and prevent UEs from transmitting. In some aspects, the roles between UE and CBSD as shown in FIG. 3 may be reversed, and the SAS controller may send an RRTS in response to an RTS sent by a CBSD in order to prevent the CBSD from transmitting.

Various aspects of this disclosure may therefore include a central control node that can control channel access to a shared channel for network access nodes and terminal devices, in particular by transmitting transmission request rejections that can overrule transmission grants. While some demonstrative examples provided herein may refer to specific use cases, such as SAS, LSA, and CSMA/CA, the aspects of this disclosure are not so limited and can be generally applied to numerous other use cases (in particular that share common characteristics with respect to spectrum sharing, listen-before-talk, and contention-based protocols) without departing from the scope and spirit of this disclosure.

Figure 4A:
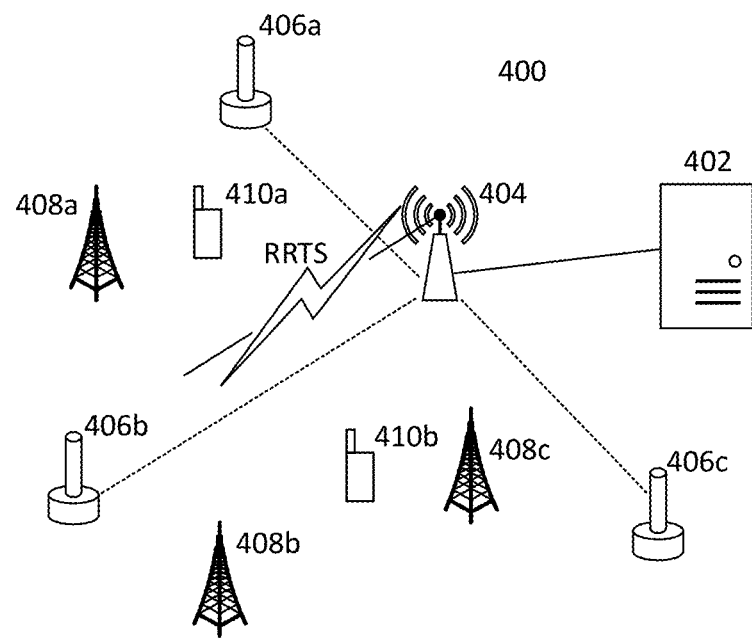
FIGS. 4A and 4B show exemplary network architectures for managing access to a shared channel with a central control node and local control node according to some aspects.
Figure 4B:
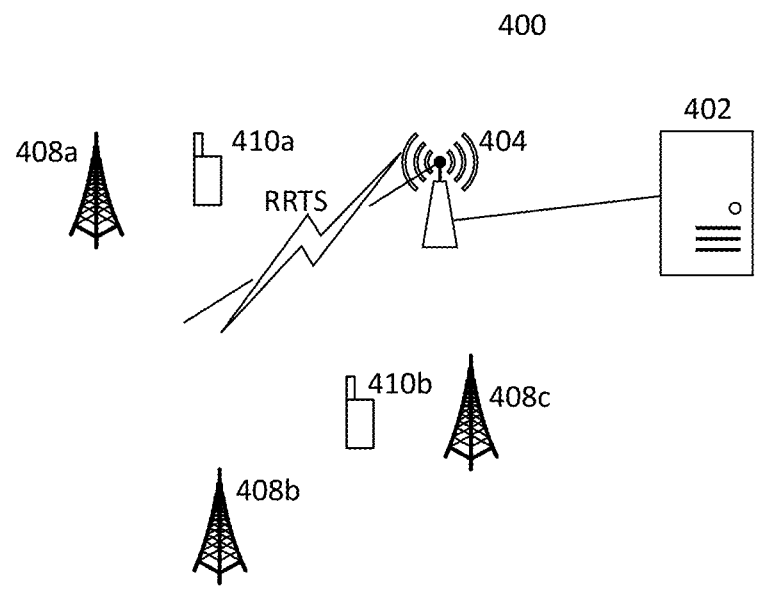

FIGS. 4A and 4B show an exemplary shared spectrum network 400 in which a central control node 402 may use a local control node 404 to manage access to a shared channel. The shared channel may be shared between various transmitters including network access nodes 408*a*-408*b* and terminal devices 410*a*-410*b*. In some aspects, central control node 402 may be a SAS controller (e.g., SAS controller 204 or 206) and local control node 404 may be a local sub-SAS entity, while network access nodes 408*a*-408*c* may be CBSDs (e.g., any of CBSD1-CBSD6) and terminal devices 410*a*-410*b* may be UEs (e.g., any of USER1-USER6). In such aspects, network access nodes 408*a*-408*c* and terminal devices 410*a*-410*b* may belong to one or more GAA users, or in other words, one or more network entities that have leased GAA spectrum as part of a SAS framework. In some aspects, network access nodes 408*a*-408*c* and terminal devices 410*a*-410*b* may belong to separate GAA users (e.g., separate network operators that have leased GAA spectrum), while in other aspects network access nodes 408*a*-408*c* and terminal devices 410*a*-410*b* may belong to the same GAA user.

Network access nodes 408*a*-408*c* and terminal devices 410*a*-410*b* may share the shared channel by contending for the shared channel according to a contention-based protocol. For example, in some aspects the contention-based protocol may be a listen-before-talk protocol (such as CSMA/CA as described above), while in other aspects the contention-based protocol may be a different type of contention-based protocol. In order to manage excessive competition for the shared channel, central control node 402 and local control node 404 may utilize transmission request rejections to manage access to the channel and subsequently alleviate congestion.

Local control node 404 may be responsible for transmitting transmission request rejections, or RRTSs, in response to transmission requests by any of network access nodes 408a-408b or terminal devices 410a-410b. In some aspects, local control node 404 may have primary control over transmitting transmission request rejections, while in other aspects central control node 402 may have primary control over the transmission of transmission request rejections by local control node 404.

Figure 5:
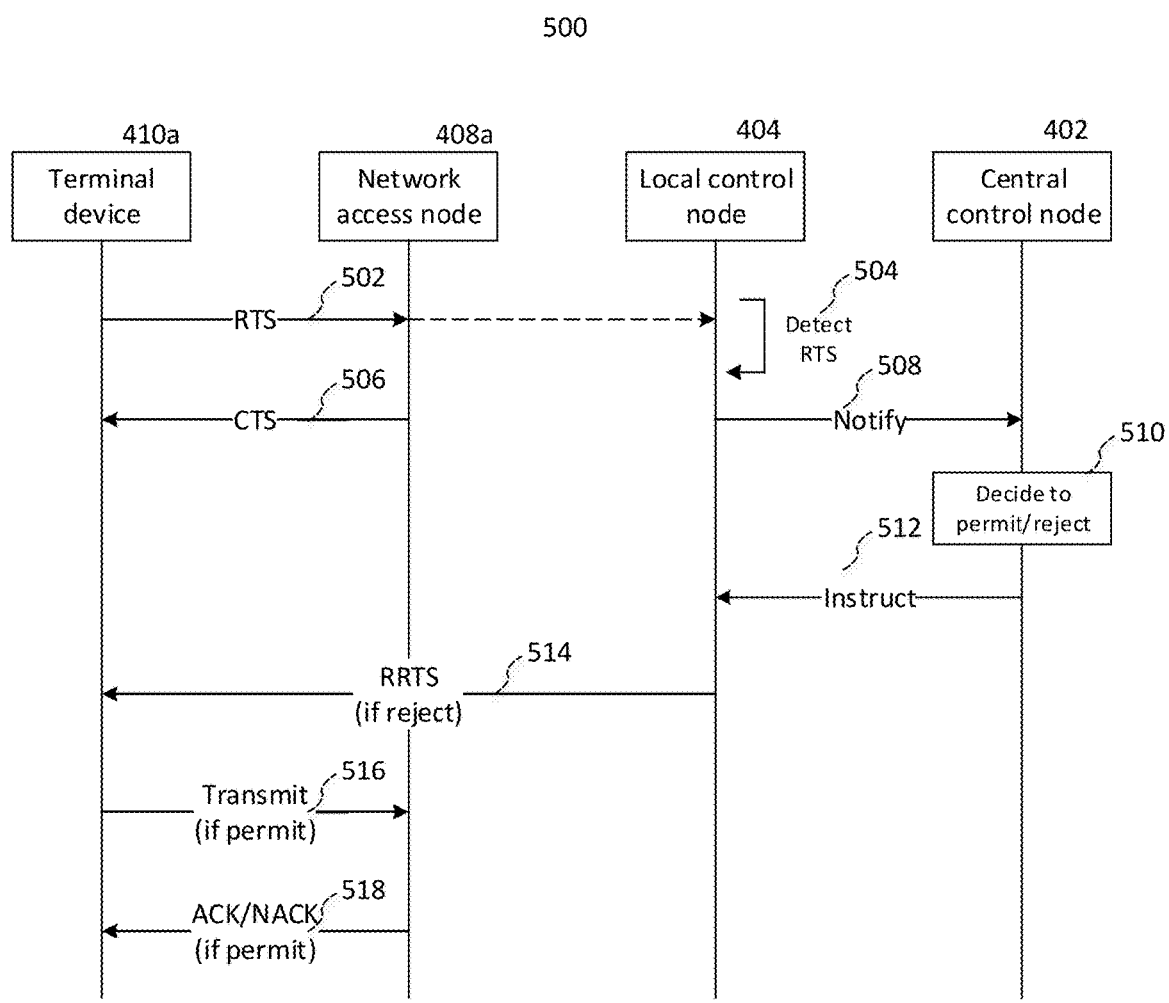
FIG. 5 shows an exemplary message sequence chart illustrating management of a shared channel with a central control node having primary control over rejection decisions according to some aspects.

FIG. 5 shows message sequence chart 500 in accordance with some aspects where central control node 402 has primary control over the transmission of transmission request rejections by local control node 404. As shown in FIG. 5, one of terminal devices 410a-410b, such as terminal device 410a, may transmit a transmission request, or RTS, to one of network access nodes 408a-408c, e.g. network access node 408a, at stage 502. For example, terminal device 410a may have pending data intended for network access node 408a, and may send the transmission request in stage 502 as part of a contention-based protocol, such as CSMA/CA, by which terminal device 410a aims to reserve the shared channel to transmit its pending data. Network access node 408a may then receive the transmission request at stage 502.

Local control node 404 may detect the transmission request at stage 504. For example, in some aspects related to FIG. 4A local control node 404 may interface with a sensor network 406 including sensors 406a-406c. Sensors 406a-406c may be radio sensors that are equipped with antennas, RF, and communication circuitry components that are capable of receiving and interpreting messages such as transmission requests sent by the transmitters of shared spectrum network 400. In some aspects sensor network 406 may be re-purposed from another deployment function, such as where sensor network 406 is deployed for incumbent detection in accordance with SAS protocols. In other aspects, sensor network 406 may be specifically deployed for detection of transmission requests.

Local control node 404 may therefore be able to receive and interpret messages such as the transmission request sent by terminal device 410a in stage 502 through the use of sensor network 406a-406c. In some aspects, local control node 404 may also include local sensing capabilities, such as its own antennas, RF, and communication circuitry that can receive and interpret signals transmitted over shard spectrum network 400. Local control node 404 may therefore be able to receive and interpret messages such as transmission requests via one or both of its local sensing capabilities and sensor network 406. In some aspects, the local sensing capabilities of local control node 404 may be part of the same communication system that local control node 404 uses to transmit and receive signals on shared spectrum network 400, while in other aspects the local sensing capabilities may be separate and thus dedicated only to sensing for messages on shared spectrum network 400.

Alternatively, in some aspects related to FIG. 4B local control node 404 may not be provided with a sensor network 406. In such aspects, local control node 404 may utilize its local sensing capabilities to receive and interpret signals on shared spectrum network 400. Furthermore, in some aspects sensors 406a-406c may be other network access nodes which, in addition to native mobile communication functionality, can also be functionally re-purposed to act as a sensor in accordance with aspects disclosed herein. For example, in some aspects one or more of sensors 406a-406c may be other network access nodes that, in addition to serving terminal devices in accordance with conventional mobile communications, also act as sensors that local control node 404 can use to detect transmission requests (which network access nodes may be natively configured to perform as part of conventional mobile communications).

Using sensor network 406 and/or local sensing capabilities, local control node 404 may detect the transmission request from terminal device 410a at stage 504. For example, local control node 404 may receive and process the transmission request, which may include payload information that identifies terminal device 410a as the origin and network access node 408a as the destination for the pending data. In some aspects, sensors 406a-406c may fully receive and process the transmission request (e.g., RF and baseband processing) to obtain this payload information, and then provide this payload information to local control node 404. In other aspects, sensors 406a-406c may only partially receive and process the transmission request (e.g., RF processing to digitize the received data) and may provide partially processed data of the transmission request to local control node 404. In such aspects, local control node 404 may then complete the processing to recover the payload information of the transmission request.

As previously indicated, in the setting of FIG. 5, central control node 402 may exert primary control over the transmission of transmission request rejections by local control node 404. Accordingly, after detecting the transmission request in stage 504, local control node 404 may notify central control node 402 of the detected transmission request at stage 508. For example, in some aspects local control node 404 may transmit a message to central control node 402 that indicates the payload information of the transmission request (the origin of the transmission request, the destination of the pending data) in addition to other information, for example, the time that the transmission request was detected by local control node 404 or transmitted.

In some aspects, such as where central control node 402 is a SAS controller, local control node 404 (e.g., a local sub-SAS entity) may be deployed at a remote location from central control node/SAS controller 402. For example, depending on the specific deployment and agreed-upon standards for SAS, there may only be one (or several) SAS controllers in a given county, state, country, province, or other predefined geographic region. Accordingly, central control node/SAS controller 402 may be provided as a server while local control node/local sub-SAS entity 404 may be deployed at a location near where GAA transmitters are active (and where numerous local control nodes/local sub-SAS entities may be distributed across the geographic area served by central control node/SAS controller 402).

Given the potential for such remote deployment of local control node 404 relative to central control node 402, in some aspects local control node 404 may interface with central control node 402 over a long-distance connection, such as a wired Internet connection. In aspects such as introduced above where there are numerous local control nodes distributed across a geographic area which central control node 402 serves, each of the local control nodes may interface with central control node 402 to exchange information, such as in stage 508.

After being notified by local control node 404 of the transmission request by terminal device 410a, central control node 402 may decide whether to permit or reject the transmission request in stage 510. Central control node 402 may then instruct local control node 404 whether to permit or reject the transmission request in stage 512. After receiving the instruction from central control node 402, local control node 404 may then either permit the transmission request or reject the transmission request. If central control node 402 instructs local control node 404 to permit the transmission request, local control node 404 may refrain from sending a transmission request rejection, and may instead not send any message in response to the transmission request. If central control node 402 instructs local control node 404 to reject the transmission request, local control node 404 may send a transmission request rejection in stage 514. For example, local control node 404 may include an antenna, RF circuitry, and communication circuitry that is configured to generate a transmission request rejection to obtain baseband data, RF circuitry that is configured to mix the transmission request rejection onto an RF carrier to obtain a radio signal, and an antenna that is configured to wirelessly transmit the radio signal.

In some aspects, the transmission request rejection may include specific information about the rejection, such as information that identifies the transmission request from stage 502 as the transmission request that is being rejected and/or that identifies terminal device 410a as the transmitter whose transmission request is being rejected. In some aspects, the transmission request rejection may also specify a defer time, which is a time period that terminal device 410a must wait before attempting to transmit again (e.g., before sending out another transmission request). In some aspects, local control node 404 may determine the defer time, while in other aspects central control node 402 may determine the defer time and specify the defer time to local control node 404 (e.g., as part of the instructions in stage 512). For example, in either case, local control node 404 or central control node 402 may determine the defer time based on current conditions, such as the current system load and/or current collision probability of shared spectrum network 400.

As shown in FIG. 5, network access node 408a may transmit a transmission grant in response to the transmission request in stage 506. If the transmission request was permitted by central control node 402 and local control node 404 consequently did not transmit a transmission request rejection, terminal device 410a may proceed to transmit the pending data in response to the transmission grant in stage 516. Network access node 408a may then receive the data from terminal device 410a and send an acknowledgement/non-acknowledgement (ACK/NACK) in response in stage 518 (or, in the case of ACK-only, send an ACK or not send a response).

Conversely, if the transmission request was rejected by central control node 402 and local control node 404 consequently transmitted a transmission request rejection in stage 415, terminal device 410a may receive the transmission request rejection from local control node 404. Accordingly, terminal device 410a may determine that its transmission request has been rejected (e.g., by identifying specific information in the transmission request that identifies its transmission request and/or identifies terminal device 410a as the transmitter being rejected), and thus may refrain from transmitting the data. If the transmission request rejection specifies a defer time, terminal device 410a may wait for the duration of the defer time until attempting to transmit again (e.g., before transmitting another transmission request). In some aspects where the transmission request rejection does not specify a defer time, terminal device 410 may perform a backoff procedure in accordance with the contention-based protocol (e.g., CSMA/CA) before attempting to transmit again.

In the exemplary case shown in FIG. 5, terminal device 410a may receive the transmission grant at stage 506 prior to receiving the transmission request rejection in stage 514. Accordingly, terminal device 410a may be configured to wait for a period of time after receiving a transmission grant to see if a transmission request rejection is also received (where the period of time may be at least as long as the duration between stages 506 and 508 in FIG. 5). If a transmission request rejection is received, terminal device 410a may refrain from transmitting the pending data; otherwise, terminal device 410a may transmit the pending data. If terminal device 410a receives the transmission request rejection before the transmission grant (e.g., where local control node 404 executes stage 514 before network access node 408a executes stage 506), terminal device 410a may similarly ignore the transmission grant and refrain from transmitting the pending data.

Central control node 402 may therefore have primary control over decisions of whether to permit or reject transmission requests in shared spectrum network 400. While described in message sequence chart as permitting/rejecting a transmission request by a terminal device, central control node 402 and local control node 404 may permit/reject transmission requests by network access nodes in the same manner.

Figure 6:
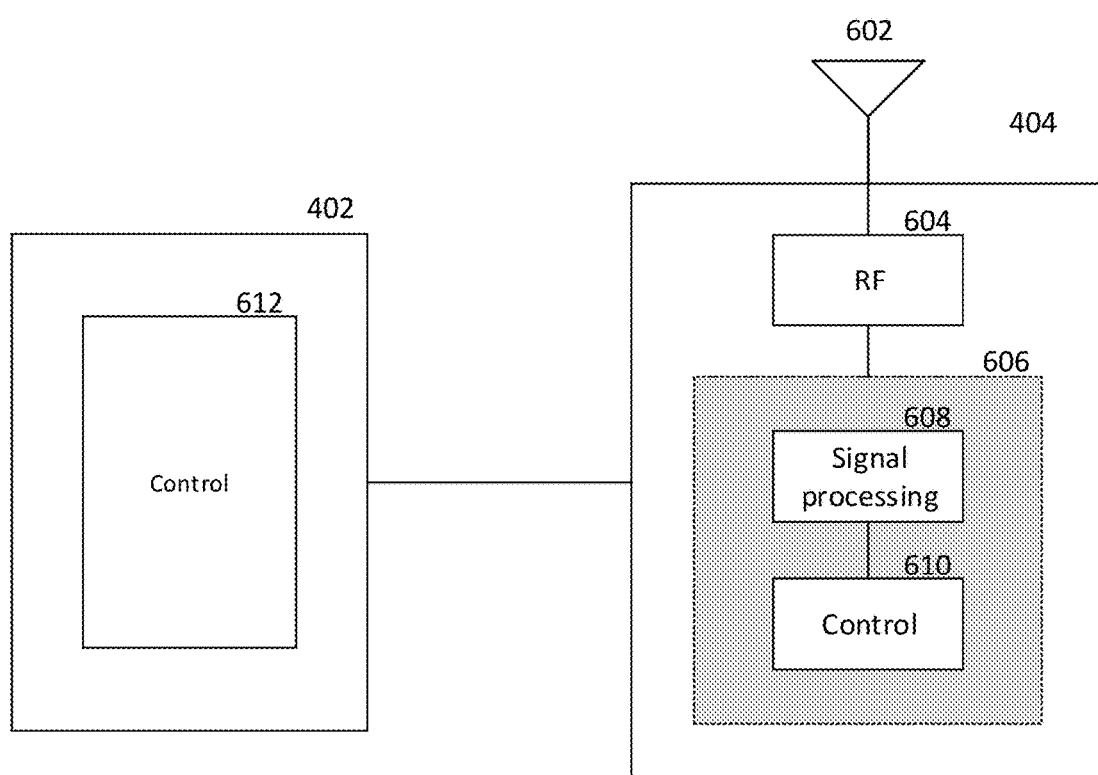
FIG. 6 shows an exemplary internal configuration of a central control node and local control node according to some aspects.

FIG. 6 shows an exemplary internal configuration of central control node 402 and local control node 404 according to some aspects. As shown in FIG. 6, central control node 402 may include controller 612. Controller 612 may include one or more processors configured to retrieve (e.g., from a non-transitory compute readable medium) and execute program code that defines the algorithmic and control functionality of central control node 402. As described herein, controller 612 may be configured to perform processing functions such as determining a rejection strategy, determining objectives/instructions for one or more local control nodes, deciding whether to permit or reject transmission requests, activating network access nodes as local control nodes, and other related tasks. These processing functions may therefore be embodied as executable program code and stored at a memory of central control node 402, which controller 612 may retrieve and execute to realize the functions of central control node 402 as described herein.

Local control node 404 may include antenna system 602, RF transceiver 604, and baseband system 606 including signal processing circuitry 608 and controller 610. Local control node 404 may transmit and receive radio signals with antenna system 602, which may include one or more antennas. RF transceiver 604 may perform transmit and receive RF processing to convert outgoing digital data provided by baseband system 606 into analog RF signals (to provide to antenna system 602 for wireless transmission) and to convert analog RF signals received from antenna system 602 into digital data (to provide to baseband system 606 for baseband processing). Digital signal processing circuitry 608 may include one or more digitally-configured hardware circuits (e.g., digital logic circuits, ASICs, or FPGAs) that are individually dedicated to perform one or more of the baseband signal processing functions. on digital data (received from RF transceiver 604 in the receive direction or from controller 610 in the transmit direction), which may include error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, and other baseband signal processing functions. Digital signal processing circuitry 608 may include one or more digitally-configured hardware circuits that are individually dedicated to perform one or more of the baseband signal processing functions. Controller 610 may control the communication functionality of local control node 404 according to one or more communication protocols, which may include exercising control over the lower-layer components including antenna system 602, RF transceiver 604, and digital signal processing circuitry 608 to transmit and receive data in the form of radio signals over a radio communication network. Controller 610 may transmit and receive radio signals via the lower-layer components, where controller 610 may provide the original baseband data in the transmit direction and recover the original baseband data in the receive direction.

Accordingly, controller 610 may control the functionality of local control node 404 to detect transmission requests at stage 504, notify central control node 402 of detected transmission requests at stage 508, receive and interpret instructions from central control node 402 at stage 512, and to transmit a transmission request rejection at stage 514. In some aspects where controller 610 detects transmission requests via its local sensing capabilities, controller 610 may detect the transmission request at stage 504 by identifying a transmission request within digital data provided by digital signal processing circuitry 608 that was initially received as radio signals by antenna system 602. In other aspects where controller 610 detects transmission requests via sensor network 406, controller 610 may detect the transmission request at stage 504 by receiving and processing data from sensor network 406 to determine that a transmission request was detected. In some aspects, controller 610 may generate the transmission request rejection of stage 514 as baseband data and provide the baseband data to the lower-layer components for wireless transmission.

While FIG. 5 shows central control node 402 considering a single transmission request at one point in time, many actual deployments will see large numbers of transmission requests, e.g. in the order of hundreds or more per second, by many different transmitters. Accordingly, in some aspects central control node 402 may be configured to consider individual transmission requests according to a comprehensive rejection strategy that influences many transmission requests in a collective manner.

For example, in some aspects central control node 402 may render permission/rejection decisions as part of a rejection strategy that attempts to meet a target collision probability, where the target collision probability is a desired level (or percentage) of transmissions that will result in collisions (where lower collision probabilities are more desirable). Central control node 402 may therefore decide whether to permit or reject the transmission request in stage 510 based on the whether the actual target collision probability is greater than the target collision probability.

For example, given a particular target collision probability and the current collision probability (which may be, for example, measured and reported by local control node 404 and/or reported by network access nodes 408a-408c), central control node 402 may be configured to determine a percentage of transmission requests that should be rejected in order to reach the target collision probability within shared spectrum network 400. For example, if the current collision probability is greater than the target collision probability by a certain difference, central control node 402 may calculate a percentage of transmission requests according to the difference that, if rejected, will decrease the current collision probability towards the target collision probability. In some aspects, central control node 402 may then randomly select transmission requests to reject according to the calculated percentage, such as where a rejected transmission request is randomly chosen in an interval [0, . . . , N−1] where N defines the total number of transmitters in shared spectrum network 400.

Central control node 402 may consider other metrics as part of the rejection strategy employed in stage 510. For example, central control node 402 may be able to measure quantify the current congestion on the shared channel, such as by the number of transmission attempts per unit time, where higher numbers high congestion and low numbers indicate low congestion. Central control node 402 may be configured to determine the current congestion level (such as based on reports from local control node 404, e.g. as obtained via local sensing capabilities or sensor network 406, and/or from network access nodes 408a-408c), and then identify a percentage of transmission requests that should be rejected based on the current congestion level. For example, central control node 402 may use a lookup table that maps congestion level to rejection percentage and periodically enter the current congestion level into the lookup table to obtain a rejection percentage. Central control node 402 may then make permission/rejection decisions, such as in stage 510, for transmission requests based on the rejection percentage, such as by randomly choosing a number of transmission requests to reject per period of time to realize the rejection percentage. Accordingly, if central control node 402 randomly selects to reject the transmission request by terminal device 410a in stage 510, central control node 402 may instruct local control node 404 to reject the transmission request in stage 512.

Additionally or alternatively, in some aspects central control node 402 may assign certain transmitters (network access nodes and/or terminal devices) into different groups, and permit each group to access the shared channel during different periods of time as part of the rejection strategy. This may assist in alleviating congestion and permit fairer access to the channel. For example, central control node 402 may identify first and second groups of transmitters of shared spectrum network 400 (e.g., each including one or both of network access nodes and terminal devices). Central control node 402 may then permit the first group to transmit (by instructing local control node 404 to permit transmission requests by these transmitters) and prohibiting the second group from transmitting (by instructing local control node 404 to reject transmission requests by these transmitters) during a first period of time. Then, during a second period of time, central control node 402 may prohibit the first group from transmitting and permit the second group from transmitting. In some aspects, the first and second periods of time can repeat in an alternating manner, and accordingly central control node 402 may control access to the shared channel such that it is fairly shared between the transmitters of the first and second groups. While the transmitters in each group will still compete against each other for access to the shared channel during their permitted time period, these transmitters will not have to compete against the transmitters of the other group, thus leading to better congestion management.

In some aspects, central control node 402 may utilize more than two groups and time periods, and accordingly may control access to the shared channel in any such fashion with any number of groups and time periods. In some aspects, central control node 402 may use such rejection strategies to give priority access to certain transmitters. For example, in some aspects central control node 402 may assign less transmitters to one group than to other groups, thus providing the transmitters in the smaller group with less transmitters to compete with and accordingly allowing them more access to the shared channel. Additionally or alternatively, in some aspects central control node 402 may assign a longer period of time to one group than to other groups, thus providing the transmitters in the group with a longer period of time to have greater access to the shared channel. Additionally or alternatively, in some aspects central control node 402 may assign some transmitters to groups, but may not assign some transmitters to any groups. Accordingly, central control node 402 may not reject transmission requests from these unassigned transmitters and may instead permit these unassigned transmitters to access the shared channel at all times. Furthermore, in some aspects central control node 402 may inform the transmitters of their assigned group and assigned periods of time, while in other aspects central control node 402 may not inform the transmitters, and the process may be transparent to the transmitters.

Additionally, or alternatively, in some aspects central control node 402 may monitor occupancy of the shared channel by the different transmitters and reject transmission requests with a rejection strategy that facilitates equal access to the shared channel. For example, central control node 402 may quantify the channel occupancy by individual transmitters, such as by counting transmission requests and/or transmission grants from individual transmitters (which may be counted by central control node 402 or local control node 404), counting the amount of time that individual transmitters occupy the channel (e.g., the total duration of transmissions and/or receptions over some period of time; which may be counted by central control node 402 or local control node 404), or by receiving reports from individual transmitters that detail their channel occupancy metrics. Central control node 402 may be configured to compare the channel occupancy metrics of individual transmitters, and therefore to identify which transmitters are occupying the shared channel most (e.g., that take the largest share of the overall channel occupancy, which can also be based on time or total system resource usage (e.g., including frequency)). Central control node 402 may then reject transmission requests from the transmitters that have the highest channel occupancy metrics (e.g., by rejecting all transmission requests from these transmitters for a period of time, by randomly selecting a certain percentage of transmission requests from these transmitters over a period of time, etc.). This rejection strategy may therefore more fairly balance channel access, as central control node 402 may prevent transmitters for unfairly occupying the shared channel at a higher rate than other transmitters.

In some aspects, central control node 402 may therefore utilize a specific rejection strategy to govern rejection decisions, where the specific rejection strategy may be 'comprehensive' in that it targets transmission requests in a collective manner. Accordingly, if the particular rejection strategy (e.g., any noted above or similar) stipulates that the transmission request by terminal device 410a should be rejected, central control node 402 may decide to reject the transmission request in stage 510 and instruct local control node 404 accordingly in stage 512. With reference to the internal configuration of central control node 402 as shown in FIG. 6, central control node 402 may implement the rejection strategy by executing program code at controller 612 that defines the rejection strategy logic in the form of executable instructions.

Figure 7:
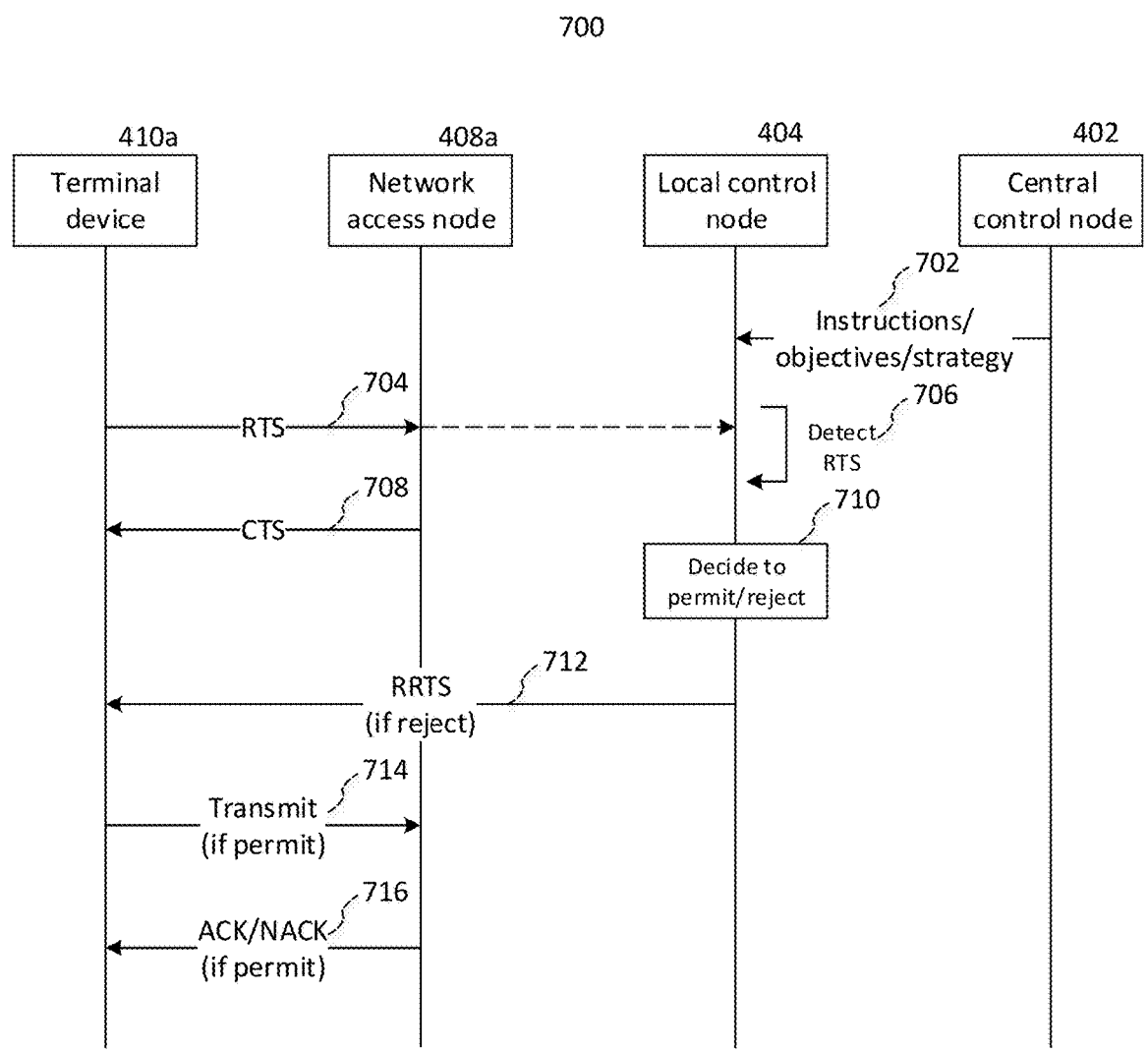
FIG. 7 shows an exemplary message sequence chart illustrating management of a shared channel with a local control node having primary control over rejection decisions according to some aspects.

In other aspects, local control node 404 may have primary control over rejection decisions. FIG. 7 shows message sequence chart 700 in accordance with some aspects where local control node 404 has primary control transmitting transmission request rejections. Accordingly, instead of central control node 402 making decisions as to which transmission requests are permitted and which are allowed, local control node 404 may have decision-making capabilities. Local control node 402 exercise control over rejection decisions by executing program code at controller 610 that defines rejection strategy logic in the form of executable instructions.

In particular, central control node 402 may provide local control node 404 with instructions or objectives in stage 702 that govern the rejection strategy used by local control node 404. For example, in some aspects, central control node 402 may provide local control node 404 with a target congestion metric, such as a target collision probability. In some aspects, central control node 402 may provide local control node 404 with a description of a rejection strategy, such as to reject a certain amount of transmission requests for one or a group of specific individual transmitters. For example, in some aspects central control node 402 may provide a rejection percentage that specifies the percentage of transmission requests that local control node 404 should reject over a period of time. In some aspects, central control node 404 may identify groups of transmitters and/or periods of times in which transmitters should be permitted to access the shared channel. Numerous similar variations are also within the scope of this disclosure, where central control node 402 may generally provide some objective, specific instruction, or rejection strategy for local control node 404 to implement.

After receiving the instructions/objectives/rejection strategy from central control node 402, local control node 404 may determine an appropriate rejection strategy and begin implementing the rejection strategy. If central control node 402 provides a specific rejection strategy, local control node 404 may utilize the rejection strategy (e.g., by executing program code at controller 610 that defines the rejection strategy logic in the form of program instructions). If central control node 402 provided instructions or an objective, local control node 404 may determine a rejection strategy based on the instructions or objective. For example, if central control node 402 specified a target collision probability, local control node 404 may compare the current collision probability (e.g., as measured with internal sensing capabilities or sensor network 406, or as reported by network access nodes 408a-408b) to the target collision probability and determine a rejection strategy that will shape the current collision probability towards the target collision probability. If the target collision probability is less than the current collision probability, local control node 404 may determine a rejection strategy that rejects a greater percentage of transmission requests than are currently being rejected (if any). If the target collision probability is greater than the current collision probability (e.g, the target collision probability is already being met), local control node 404 may either determine a rejection strategy that rejects a lesser percentage of transmission requests than are currently being rejected or may keep the same rejection strategy as is currently being used. Local control node 404 may generally determine a rejection strategy (e.g., any predictable or deterministic pattern of rejecting transmission requests) in any manner as detailed above regarding central control node 402 in the context of FIG. 5, including identifying a percentage of transmission requests to randomly reject, assigning different transmitters to different groups with different periods of time in which individual groups are permitted to transmit (without being rejected), identifying transmitters that have high occupancy rate of the channel (e.g., measured according to time and/or by total resource use (including frequency)), etc.

Local control node 404 may then begin applying the rejection strategy. As shown in FIG. 7, terminal device 410a may send a transmission request to network access node 408a in stage 704, which local control node 406 may detect at stage 706. For example, local control node 404 may utilize sensor network 406 and/or its local sensing capabilities to receive and identify the transmission request.

Network access node 408a may then transmit a transmission grant to terminal device 410a in stage 708 in response to the transmission request. Terminal device 410a may then wait for a period of time to see if any transmission request rejections will be transmitted in response to its transmission request.

Local control node 404 may then decide whether the permit or reject the transmission request in stage 710. For example, local control node 404 may apply the rejection strategy received at stage 702 or determined based on the instructions/objectives provided by central control node 402 at stage 702. Accordingly, in contrast to as in the setting of message sequence chart 500, local control node 404 may render the decision as to whether or not to permit or reject the transmission request.

If local control node 404 decides to permit the transmission request in stage 710, local control node 404 may refrain from transmitting a transmission request rejection, and in some aspects may not transmit anything in direct response to the transmission request by terminal device 410a. Accordingly, the period of time which terminal device 410a is waiting after receipt of the transmission grant at stage 708 may expire, at which point terminal device 410a may transmit its pending data in stage 714. Network access node 408a may then receive the data and respond with an ACK/NACK in stage 716 depending on whether the data was successfully received or not (or, in the case of ACK-only, send an ACK or not send a response).

If local control node 404 decides to reject the transmission request in stage 710, local control node 404 may transmit a transmission request rejection to terminal device 410a in stage 712. As described above, in some aspects the transmission request rejection may include specific information, such as specifying that the transmission request rejection is rejecting the transmission request made by terminal device 410a in stage 704, or specifying a defer time during which terminal device 410a should wait until attempting to transmit again. In some aspects using a defer time, local control node 404 may determine the defer time and include it in the transmission request rejection.

Terminal device 410a may then receive the transmission request rejection in response to its transmission request from stage 704, and may therefore not transmit the pending data. Instead, terminal device 410a may wait to transmit the pending data, such as by waiting according to a backoff procedure of the contention-based protocol or according to a defer time specified by local control node 404 in the transmission request rejection.

The network architectures shown in FIGS. 4A-4B and as described in FIGS. 5 and 7 may therefore provide for greater control over access to a shared channel among competing transmitters. While the demonstrative descriptions above may be generally applied to any type of contention-based protocol, these implementations may be particularly well-suited to network architectures already having a central control entity, such as for spectrum sharing networks like SAS. For example, central control node/SAS controller 402 may manage access to shared GAA channels by GAA transmitters such as network access nodes 408a-408c and terminal devices 410a-410b through a remotely-deployed local control node/local sub-SAS entity 404. Central control node/SAS controller 402 may either have primary control over the transmission request rejections (and thus have control over access to the shared GAA channels) or may hand over primary control to local control node/local sub-SAS entity 404 (and may retain a certain degree of control via the provision of instructions/objectives/rejection strategies to local control node/local sub-SAS entity 404). Even if the various GAA transmitters belong to different network operators, central control node/SAS controller 402 and local control node/local sub-SAS entity 404 may still manage access to the shared GAA channels, and thus manage congestion, through the transmission of transmission request rejections. As previously indicated, in some aspects local control node/local sub-SAS entity 404 may be one of a distributed network of local control nodes/local sub-SAS entities that are provided across a geographic area that is served by central control node/SAS controller 402. Central control node/SAS controller 402 may therefore manage access to shared GAA channels in other geographic areas and by other GAA transmitters in the manner as detailed above regarding FIGS. 4A-4B and 5-7.

Figure 8A:
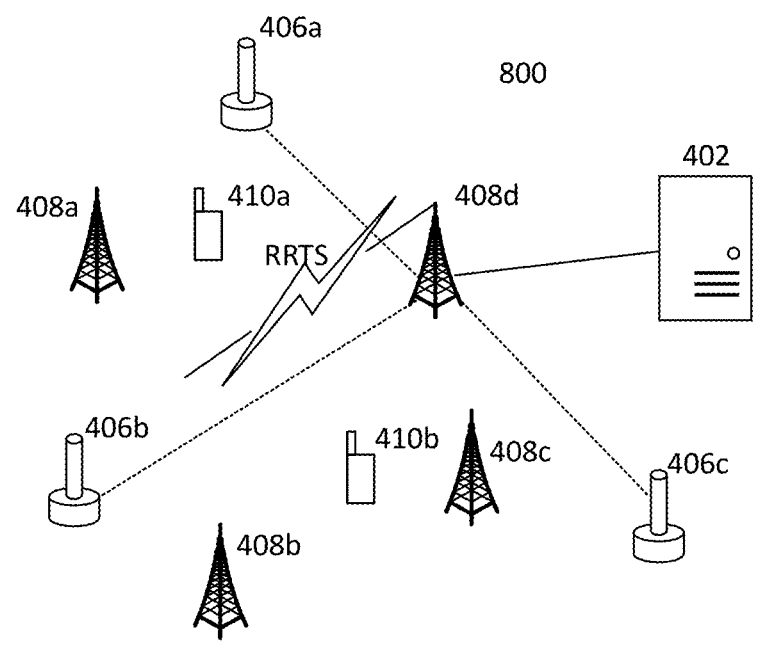
FIGS. 8A and 8B show exemplary network architectures for managing access to a shared channel with a central control node and network access node acting as a local control node according to some aspects.
Figure 8B:
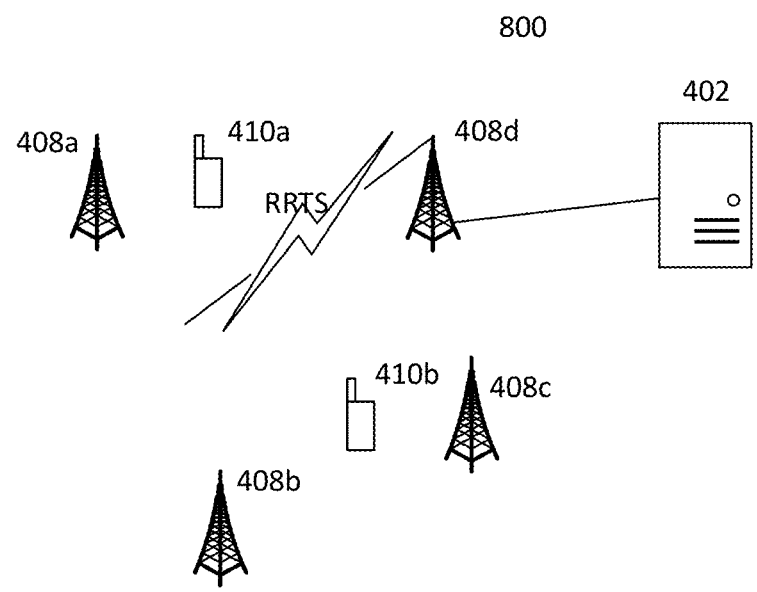

FIGS. 8A and 8B show another shared spectrum network 800 according to some aspects. As shown in FIGS. 8A and 8B, shared spectrum network 800 may generally be configured in the manner of shared spectrum network 400, including central control node 402, network access nodes 406a-406c, terminal devices 410a-410b, and, in the case of FIG. 8B, sensor network 406 including sensors 406a-406c. However, shared spectrum network 800 includes network access node 408d in the place of local control node 404 as in shared spectrum network 400.

Network access node 408d may generally be configured with the same transmission and reception functionality of network access nodes 408a-408d, and accordingly may be configured to transmit and receive data with served terminal devices and interface with a core network to provide an external connection to the served terminal devices. In addition, network access node 408d may also be configured with the functionality of local control node 404. For example, central control node 402 may provide instructions to network access node 408d to assume the role of a local control node for core network node 402, at which point network access node 408d may begin performing the functionality of local control node 404 as described in for FIGS. 4A-4B and 5-7.

Accordingly, as shown in FIGS. 8A and 8B, network access node 408d may have an interface (e.g., a wired or Internet interface) with central control node 402 through which central control node 402 may communicate with network access node 408d. Using the interface, central control node 402 may 'activate' network access node 408d as a local control node via instruction signaling. Network access node 408d may then assume the functionality of local control node 404 in either FIG. 5 or FIG. 7.

For example, if central control node 402 has primary control over access to the shared channel (e.g., in the manner of FIG. 5), network access node 408d may be configured to monitor for transmission requests from nearby transmitters over shared spectrum network 800, such as terminal devices 410a-410b and network access nodes 408a-408c. Upon detecting a transmission request from a nearby transmitter, network access node 408d may notify central control node 402 of the transmission request and wait for instructions from central control node 402 that specify whether network access node 408d should permit the transmission request (e.g., not send a transmission request rejection in response) or should reject the transmission request (e.g., send a transmission request rejection in response).

Figure 9:
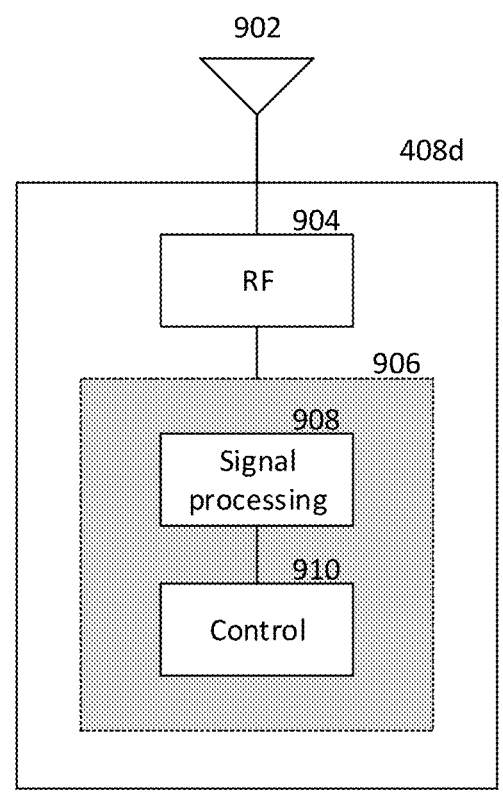
FIG. 9 shows an exemplary internal configuration of a network access node according to some aspects.

FIG. 9 shows an exemplary internal configuration of network access node 408d according to some aspects. Local control node 404 may include antenna system 902, RF transceiver 904, and baseband system 906 including signal processing circuitry 908 and controller 910. Network access node 408d may transmit and receive radio signals with antenna system 902, which may include one or more antennas. RF transceiver 904 may perform transmit and receive RF processing to convert outgoing digital data provided by baseband system 906 into analog RF signals (to provide to antenna system 902 for wireless transmission) and to convert analog RF signals received from antenna system 902 into digital data (to provide to baseband system 906 for baseband processing). Digital signal processing circuitry 908 may include one or more digitally-configured hardware circuits (e.g., digital logic circuits, ASICs, or FPGAs) that are individually dedicated to perform one or more of the baseband signal processing functions. on digital data (received from RF transceiver 904 in the receive direction or from controller 910 in the transmit direction), which may include error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, and other baseband signal processing functions. Digital signal processing circuitry 908 may include one or more digitally-configured hardware circuits that are individually dedicated to perform one or more of the baseband signal processing functions. Controller 910 may control the communication functionality of network access node 408d according to one or more communication protocols, which may include exercising control over the lower-layer components including antenna system 902, RF transceiver 904, and digital signal processing circuitry 908 to transmit and receive data in the form of radio signals over a radio communication network. Controller 910 may transmit and receive radio signals via the lower-layer components, where controller 910 may provide the original baseband data in the transmit direction and recover the original baseband data in the receive direction. As network access node 408d may be configured to transmit and receive radio signals with various terminal devices, controller 910 may be configured to manage the transmission and reception of data as radio signals with one or more terminal devices according to a particular communication protocol. Although not explicitly shown in FIG. 9, in some aspects network access node 408d may also have a backhaul connection to a core network.

In addition to standard mobile communication functions, controller 910 may also control the functionality of network access node 408d specific to the aspects described herein, including activating network access node 408d as a local control node, detecting transmission requests, notifying central control node 402 of detected transmission requests, receiving and interpreting instructions from central control node 402, and transmitting transmission request rejections.

As previously indicated, in some aspects network access node 408d may re-use its native radio communication functionalities, such as the ability to transmit and receive radio signals, in accordance with aspects of this disclosure. For example, controller 910 may utilize the lower-layer components of network access node 408d (antenna system 902, RF transceiver 904, and digital signal processing circuitry 908) to transmit and receive radio signals with terminal devices in addition to detecting transmission requests for reporting to central control node 402 and/or transmitting transmission request rejections. In other aspects, the lower-layer components of network access node 408d may be divided into separate sections, where a first section is allocated for mobile communication usage and a second section is allocated for the functionalities related to the aspects of this disclosure.

Figure 10:
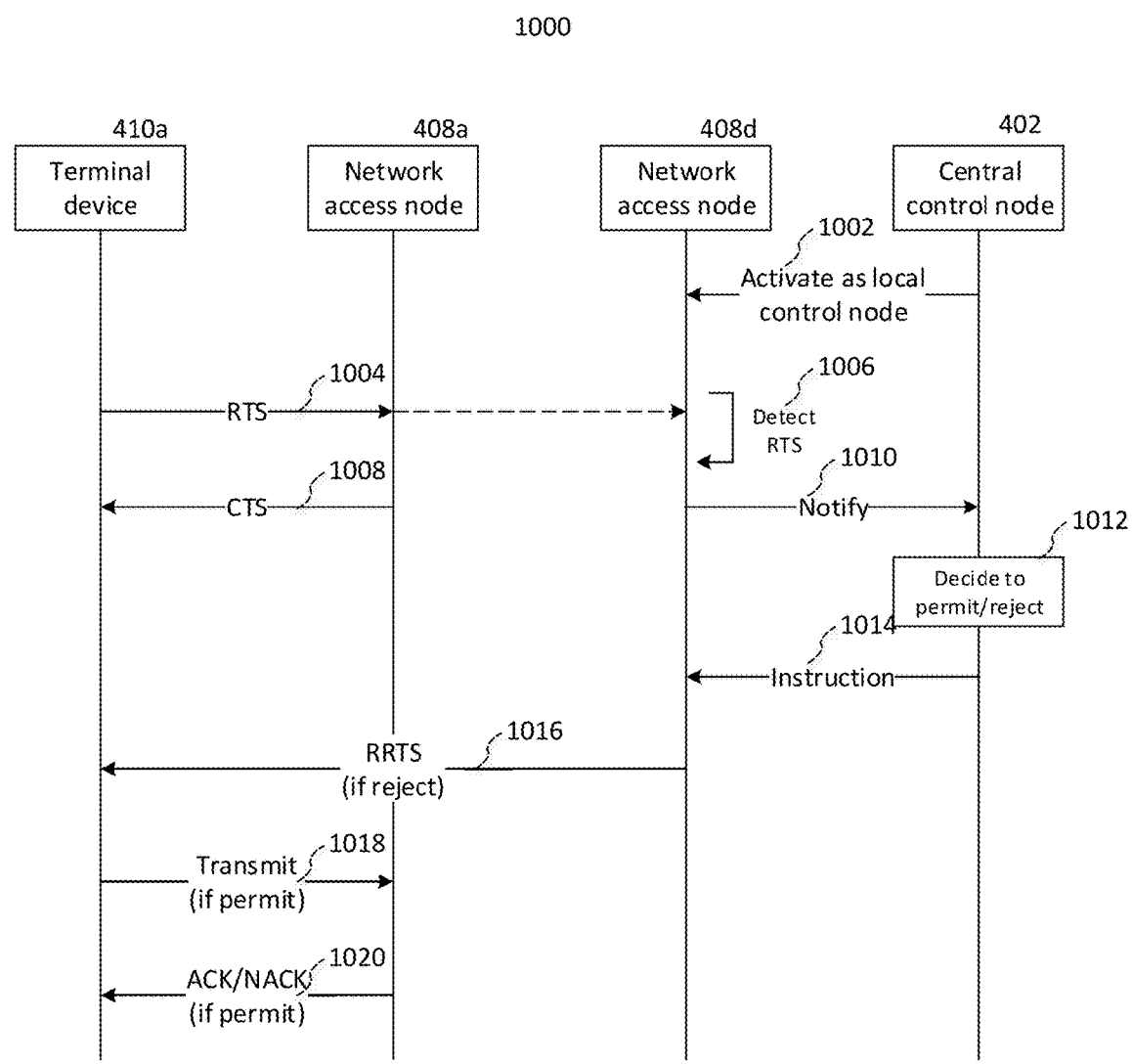
FIG. 10 shows an exemplary message sequence chart illustrating management of a shared channel with a central control node having primary control over rejection decisions and a network access node according to some aspects.

FIG. 10 shows message sequence chart 1000 illustrating the functionality of network access node 408d acting as a local control node according to some aspects. As shown in FIG. 10, central control node 402 may first activate network access node 408d as a local control node in stage 1002. After being activated as a local control node, network access node 408d may perform stages 1004-1020, along with terminal device 410a, network access node 408a, and central control node 402, in the same manner as stages 502-518 of message sequence chart 500 as described for FIG. 5.

As shown in FIGS. 8A and 8B, in some aspects network access node 408d may interface with sensor network 406 including sensors 406a-406c, while in other aspects network access node 408d may not interface with a sensor network. As previously indicated, in aspects of FIG. 8A including sensor network 406, network access node 408d may utilize sensor network 406 (optionally in addition to its local sensing capabilities, if available) to detect transmission requests by other transmitters on shared spectrum network 800. In aspects of FIG. 8B not including sensor network 406, network access node 408d may utilize its local sensing capabilities to detect transmission requests by other transmitters on shared spectrum network 800. In particular, as in some aspects network access node 408d may be configured in the manner of a network access node, network access node 408d may utilize its native reception capabilities (e.g., for use in conventional mobile communications including reception of signals from terminal devices, including antenna system 902, RF transceiver 904, and digital signal processing circuitry 908) to detect transmission requests from other transmitters. Accordingly, while certain additional fundability may be incorporated into network access node 408d to support its activation and operation as a local control node, in some aspects network access node 408d may not require additional sensing capabilities, and may instead utilize its native sensing capabilities. Alternatively, in some aspects the local sensing capabilities of network access node 408d may be provided separately from its sensing capabilities that are natively included for mobile communications (e.g., where the lower-layer components of network access node 408d divided into a first section and a second section).

In some aspects, network access node 408d may also be configured to assume primary control over access to the shared channels of shared spectrum network 800, including determining a rejection strategy and executing the rejection strategy by selectively rejecting transmission requests. Accordingly, in some aspects network access node 408d may be configured in the manner of local control node 404 as in FIG. 7 and, after being activated as a local control node by central control node 402, may perform the associated functionalities of a local control node to govern access to a shared channel.

Figure 11:
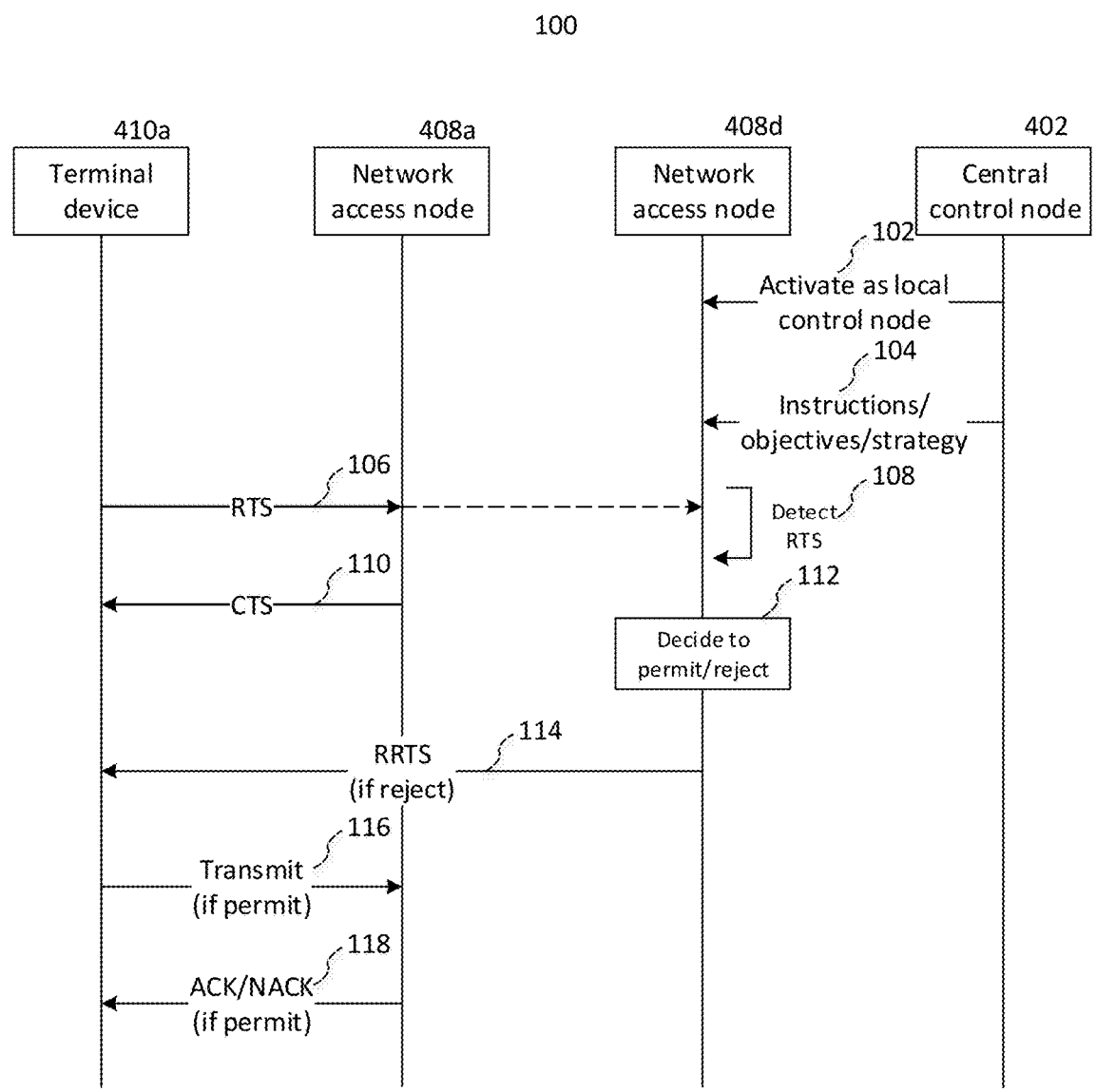
FIG. 11 shows an exemplary message sequence chart illustrating management of a shared channel with a network access node acting as a local control node having primary control over rejection decisions according to some aspects.

FIG. 11 shows message sequence chart 1100 illustrating this functionality of network access node 408d according to some aspects. As shown in FIG. 11, central control node 402 may first activate network access node 408d as a local control node in stage 1102. Central control node 402 may then specify instructions/objectives/relay strategy to network access node 408d in stage 1104 (which, in some aspects, central control node 402 may combine into a single stage with stage 1102). Network access node 408d may then determine an appropriate rejection strategy and proceed to execute the rejection strategy by selectively transmitting transmission request rejections in response to transmission requests by transmitters of shared spectrum network 800 (e.g., at controller 910 via execution of program code). Accordingly, network access node 408d may perform, along with terminal device 410a, network access node 408a, and central control node 402, stages 1106-1118 in the manner of stages 704-716 as described for local control node 404 in FIG. 7.

As previously indicated, while the demonstrative examples provided herein are not so limited, the descriptions provided above for FIGS. 8A-11 may be implemented in SAS networks. Accordingly, network access node 408d may be a CBSD while central control node 402 may be a SAS controller. Network access node/CBSD 408d may therefore receive instructions (e.g., via a dedicated SAS interface) from central control node/SAS controller 402 that activate network access node/CBSD 408d as a local control node. Network access node/CBSD 408d may then proceed to manage access to shared GAA channels of shared spectrum network 800 either using instructions from central control node/SAS controller 402 or by determining and implementing its own rejection strategy. Central control node/SAS controller 402 and network access node/CBSD 408d may therefore manage congestion over the shared GAA channels by controlling access by transmitters of shared spectrum network 800, including network access nodes 408a-408c and terminal devices 410a-410b.

In various aspects related to FIGS. 4-11, a local control node (including both dedicated local control nodes in the form of local control node 404 and of network access node 408d acting as a local control node) may wirelessly broadcast transmission request rejections to reject transmission requests. Nearby transmitters, including the transmitter from which a transmission request originated, may then wirelessly receive transmission request rejections as radio signals.

Figure 12A:
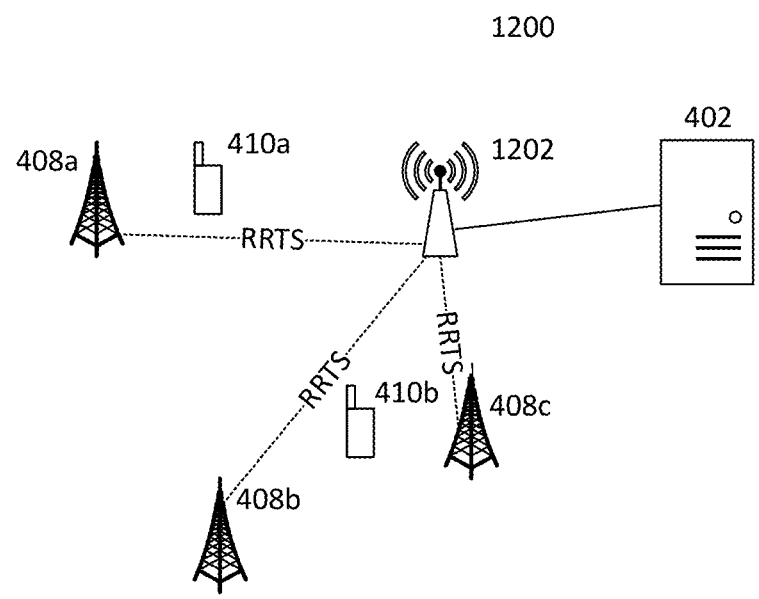
FIGS. 12A and 12B show exemplary network architectures illustrating management of a shared channel via transmission of transmission request rejections over wired interfaces according to some aspects.
Figure 12B:
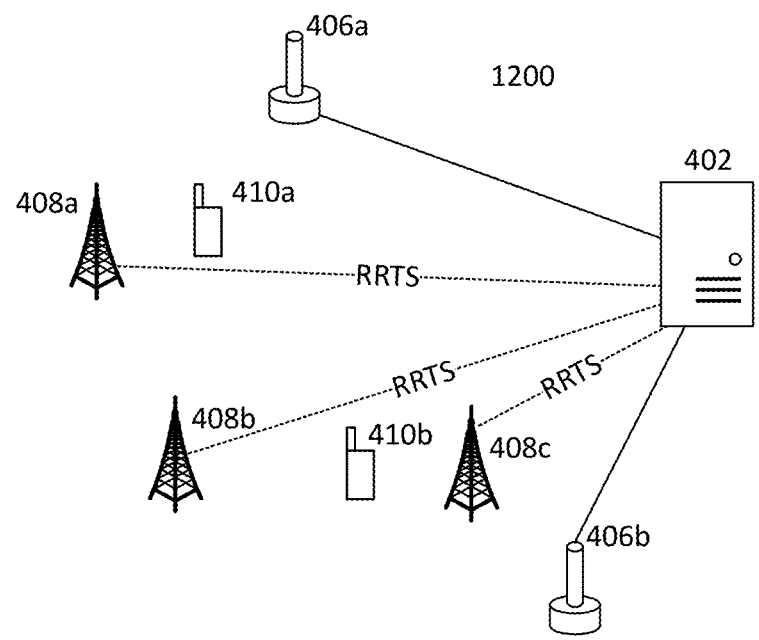

In other aspects, a local control node or central control node may instead interface directly with individual network access nodes, such as by a wired interface, and issue instructions to the network access nodes to refrain from transmitting. FIGS. 12A and 12B show demonstrative examples according to some aspects. In particular, FIG. 12A shows an exemplary configuration of shared spectrum network 1200 according to some aspects in which central control node 402 interfaces (e.g., a wired interface) with local control node 1202, which may then interface (e.g., a wired interface) with network access nodes 408a-408, while FIG. 12B shows an exemplary configuration of shared spectrum network 1200 according to some aspects where central control node 402 interfaces directly with network access nodes 408a-408c.

Figure 13:
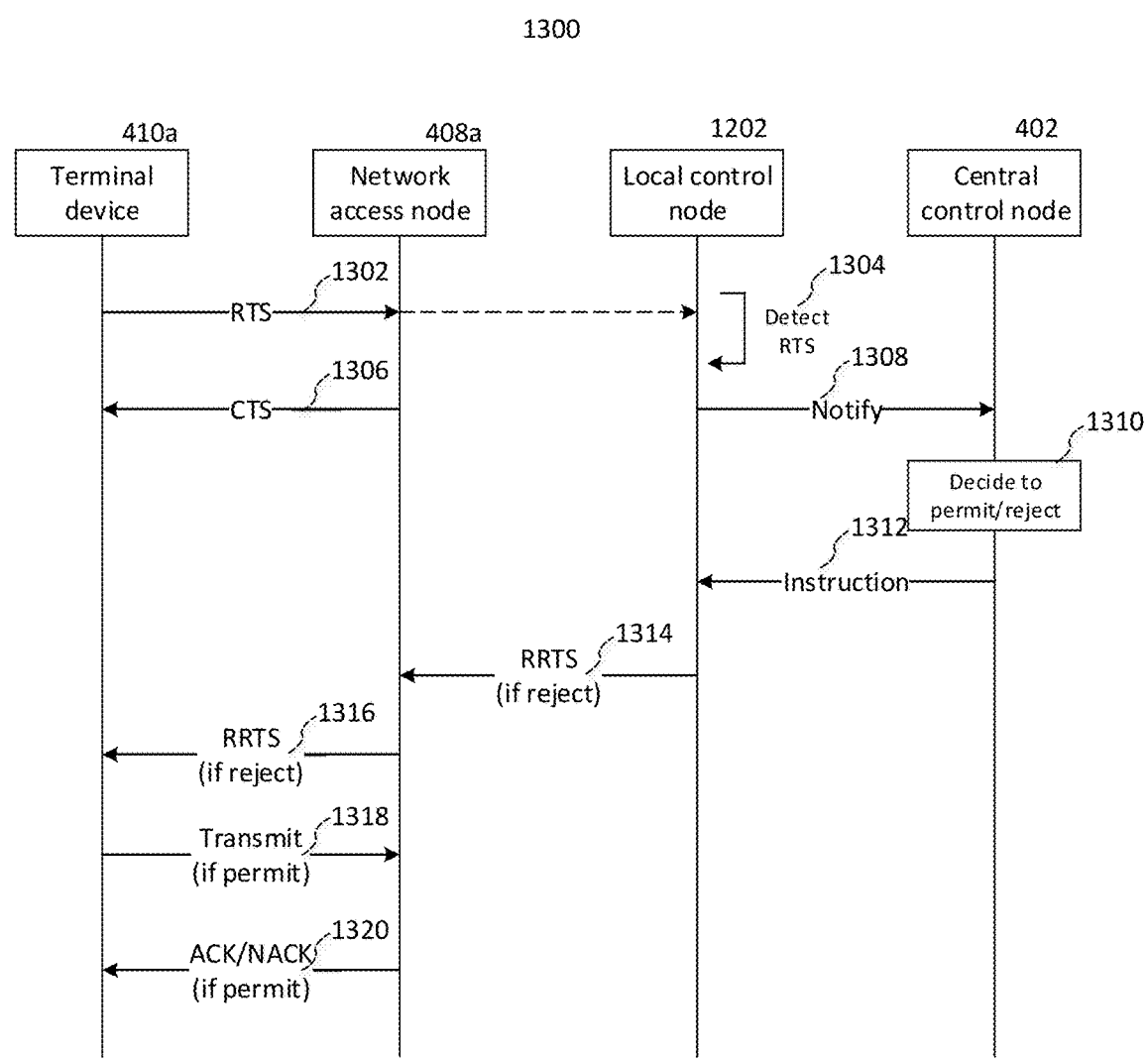
FIG. 13 shows an exemplary message sequence chart illustrating management of a shared channel via transmission of transmission request rejections over wired interfaces according to some aspects.

In the setting of FIG. 12A, local control node 1202 may be either a dedicated local control node, such as in the manner and configuration of local control node 402 (e.g., as shown and described for FIG. 6), or may be a network access node that can be activated as a local control node, such as in the manner and configuration of network access node 408d (e.g., as shown and described for FIG. 9). As depicted in FIG. 12A, local control node 1202 may transmit transmission request rejections to network access nodes 408a-408c over the respective wired interfaces. FIG. 13 shows message sequence chart 1300 illustrating this procedure according to some aspects. While FIG. 13 presents the operation of local control node 1202 according to aspects where central control node 402 has primary control over rejection decisions (e.g., in the manner of FIG. 5), this operation similarly applies to aspects where local control node 404 has primary control over rejection decisions (e.g., in the manner of FIG. 7). As shown in FIG. 13, stages 1302-1312 may be executed in the same manner as stages 502-512 of FIG. 5, and accordingly local control node 1202 may detect a transmission request sent by terminal device 410a to network access node 408a, such as either with local sensing capabilities of local control node 1202 or by a sensor network (e.g., in the manner and configuration of sensor network 406). In some aspects, network access node 408a may be configured to notify local control node 1202 of any received transmission requests via the wired interface.

After receiving an instruction from central control node 402 in stage 1312 that specifies whether to permit or reject the transmission request (or, alternatively, after locally deciding whether to permit or reject the transmission request if primary control is held at local control node 1202), local control node 1202 may either permit or reject the transmission request. If the transmission request is permitted, local control node 1202 may not send out any signaling in response to the transmission request, and terminal device 410a and network access node 408a may exchange the data and ACK/NACK in stages 1318 and 1320, respectively.

If the transmission request is rejected, local control node 1202 may transmit the transmission request rejection to network access node 408a over the wired interface at stage 1314. Accordingly, instead of wirelessly broadcasting the transmission request rejection as radio signaling, local control node 1202 may directly signal the transmission request rejection to network access node 408a. Network access node 408a may then transmit a transmission request rejection to terminal device 410a in stage 1316, which terminal device 410a may receive and subsequently refrain from transmitting its pending data until a later time (e.g., according to a backoff procedure and/or according to a defer time specified in the transmission request rejection). Alternatively, if network access node 408a receives the transmission request rejection from local control node 1202 before transmitting a transmission grant to terminal device 410a, in some aspects network access node 408a may not transmit the transmission grant to terminal device 410a. This may similarly prevent terminal device 410a from transmitting its pending data.

Furthermore, in some aspects local control node 1202 may transmit the transmission request rejection in stage 1314 to a network access node different from the network access node that was the intended recipient of the transmission request in stage 1302. For example, local control node 1202 may transmit the transmission request rejection over the wired interface to network access node 408b, which may then wirelessly transmit the transmission request rejection over the shared channel. Terminal device 410a may similarly receive the transmission request rejection from network access node 408b and consequently refrain from transmitting its pending data. In some aspects, local control node 1202 may transmit the transmission request rejection over the wired interfaces to multiple network access nodes, which may then each wirelessly transmit the transmission request rejection over the shared channel.

In cases where the transmission request is sent by a network access node that intends to transmit pending data to a terminal device, local control node 1202 may similarly detect the transmission request and, if it is rejected, may likewise transmit a transmission request rejection to the network access node via a wired interface. Accordingly, even if the network access node receives a transmission grant, the network access node may refrain from transmitting its pending data due to the receipt of the transmission request rejection from local control node 1202.

Additionally or alternatively to having a local control node interfacing with network access nodes, in some aspects such as those exemplified in FIG. 12B central control node 402 may directly interface with network access nodes 408a-408c. Central control node 402 may then control access to shared channels of shared spectrum network 1200 via transmission of transmission request rejection to network access nodes 408a-408c via wired interfaces. In some aspects, as central control node 402 may be located in a centralized server-based location, central control node 402 may utilize sensor network 406 including sensors 406a and 406b to detect transmission requests by transmitters of shared spectrum network 1200. Additionally or alternatively, in other aspects network access nodes 408a-408c may be configured to notify network access node 402 of detected transmission requests over the wired interface, and therefore may act as a sensor network for central control node 402.

In the same manner as detailed for message sequence chart 1300 of FIG. 13, central control node 402 may decide whether to permit or reject transmission requests sent by transmitters of shared spectrum network 1200. If permitted, central control node 402 may not transmit a transmission request rejection in response to a transmission request. If rejected, central control node 402 may transmit a transmission request rejection over the wired interface to one or more of network access nodes 408a-408c, which may then wirelessly transmit the transmission request rejection over the shared channel to prevent the transmission from occurring.

While demonstrated above generally for a CSMA/CA context, the aspects described herein can also be applied to other MAC layer protocols. For example, a central control node and/or a local control node (including dedicated local control nodes and network access nodes activated as a local control node) can transmit transmission request rejections for to overrule channel access grants for any type of distributed channel access protocol. Such priority can be given to selected target entities. For instance, instead of transmit RRTSs, a reject access grant (RAG) could be used as the transmission request rejection. Additionally, in some aspects, instead of just rejecting access grants, new additional grants can be issued by a central control node and/or local control node that can be used to redirect resources (e.g., made available through transmission of a transmission request rejection) to other entities.

Furthermore, in some aspects the approaches described herein can also be used to interfere with scheduled systems (as opposed to contention0-based systems). For example, a central control node or local control node can overrule scheduling information transmitted by a network access node, and the central control node or local control node can replace the overruled scheduling information with new scheduling information. This can include the transmission of revised scheduling message by the central control node or local control node following overruling of the previous scheduling information. For example, the transmission request rejection can be a reject scheduling information (RSI) instead of an RRTS. The central control node or local control node could send out the new scheduling information following an initial ID field such as a new scheduling infraction (NSI) following transmission of the transmission request rejection.

In some aspects, one or more of central control node 402, local control node 404, network access node 408d, and network access node 1202 can be characterized as a control node for operating in a network with shared channels, the control node including one or more processors (e.g., controller 612, controller 610, or controller 910) configured to execute program code to determine a rejection strategy for managing contention-based access to a shared channel by one or more transmitters, transmit or trigger transmission of a transmission request rejection in response to a transmission request by a first transmitter of the one or more transmitters according to the rejection strategy. In some aspects, central control node 402 can be characterized as a central control node for managing channel access in a shared spectrum network that is shared at least between an incumbent network and a licensee network, the control node including one or more processors (e.g., controller 612) configured to execute program code to transmit and receive signaling with one or more local control nodes to determine a rejection strategy for managing contention-based access to the shared channel, and communicate with the one or more local control nodes to implement the rejection strategy through the transmission of transmission request rejections in response to transmission requests by transmitters on the shared channel.

Figure 14:
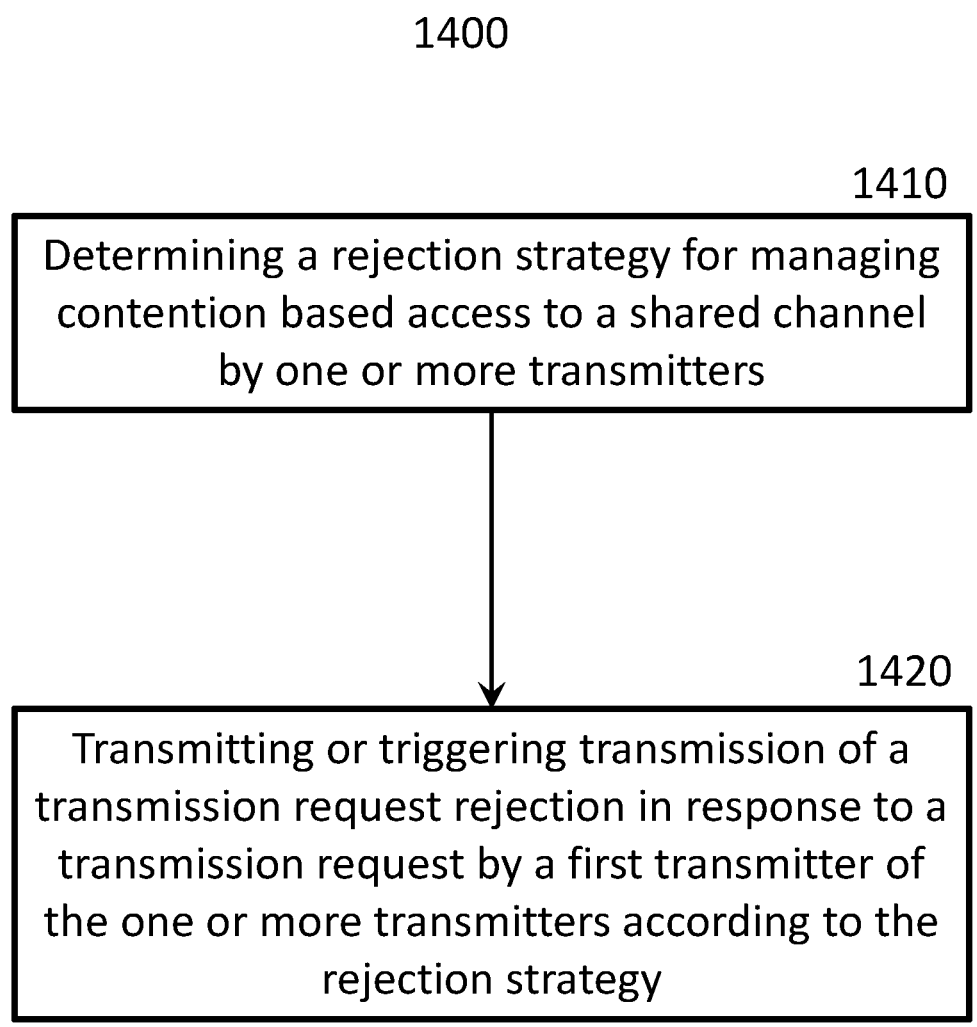
FIG. 14 shows an exemplary method of managing access to shared channels in a wireless network.

FIG. 14 shows method 1400 of managing access to shared channels in a wireless network, the method including determining a rejection strategy for managing contention-based access to a shared channel by one or more transmitters (1410), and transmitting or triggering transmission of a transmission request rejection in response to a transmission request by a first transmitter of the one or more transmitters according to the rejection strategy (1420).

Figure 15:
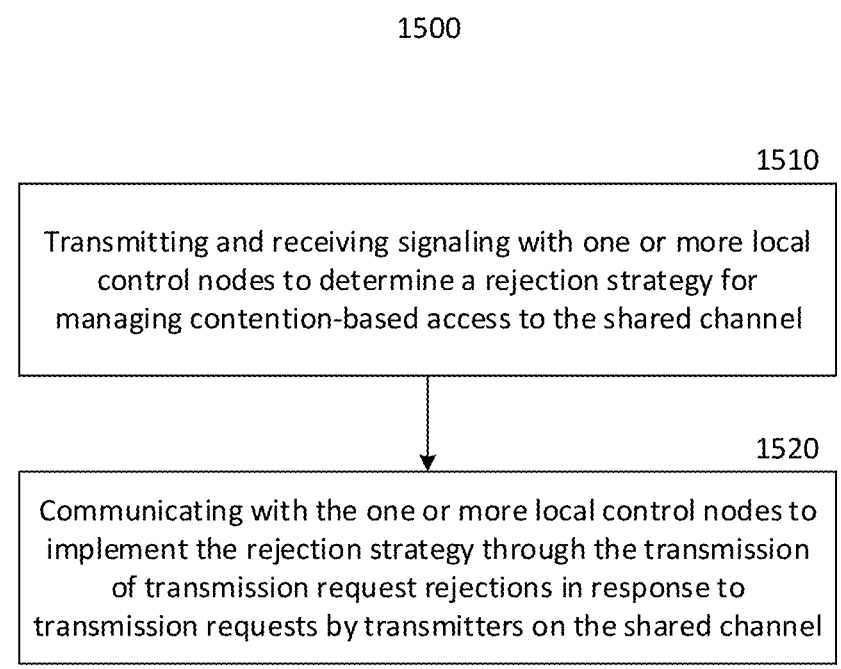
FIG. 15 shows an exemplary method managing channel access in a shared spectrum network that is shared at least between an incumbent network and a licensee network.

FIG. 15 shows method 1500 of managing channel access in a shared spectrum network that is shared at least between an incumbent network and a licensee network, the method including transmitting and receiving signaling with one or more local control nodes to determine a rejection strategy for managing contention-based access to the shared channel (1510), and communicating with the one or more local control nodes to implement the rejection strategy through the transmission of transmission request rejections in response to transmission requests by transmitters on the shared channel (1520).

The various aspects demonstratively exemplified herein may therefore be implemented to control access to a shared channel by selectively rejecting transmission requests from a higher-level authority. Accordingly, in contrast to co-deployed local networks that share spectrum on an equal basis, such as multiple separate WiFi networks deployed in proximity to each other, in aspects described herein a higher-level authority such as a central control node or local control node may have the authority to permit or reject transmission requests by co-deployed transmitters. Accordingly, the central or local control nodes may manage access to a shared channel, such as according to a rejection strategy that can alleviate congestion and ensure fair use of the shared channel. Aspects disclosed herein relating to SAS may therefore exploit the native existence of a centralized control entity such as a SAS controller to act as a higher-level authority (e.g., a global authority) and thus control access to shared spectrum.

While shared spectrum networks such as SAS have been demonstratively exemplified above, the aspects described herein may be implemented in any type of network using shared spectrum, including LSA, WiFi, Bluetooth, MulteFire and other unlicensed cellular networks, narrowband IoT, etc.

The following examples pertain to further aspects of this disclosure:

Example 1 is a control node for operating in a network with shared channels, the control node including one or more processors configured to execute program code to determine a rejection strategy for managing contention-based access to a shared channel by one or more transmitters, transmit or trigger transmission of a transmission request rejection in response to a transmission request by a first transmitter of the one or more transmitters according to the rejection strategy.

In Example 2, the subject matter of Example 1 can optionally include wherein the rejection strategy is for managing contention-based access to the shared channel according to a listen-before-talk access scheme.

In Example 3, the subject matter of Example 1 can optionally include wherein the rejection strategy is for managing contention-based access to the shared channel according to a Carrier Sense Multiple Access with Collision Avoidance (CSMA/CA) access scheme.

In Example 4, the subject matter of any one of Examples 1 to 3 can optionally include wherein the one or more processors are configured to determine the rejection strategy for managing contention-based access to the shared channel by determining a current collision probability of transmission on the shared channel that is higher than a target collision probability, and determining a rejection percentage that specifies a percentage of transmission requests for the shared channel to be rejected.

In Example 5, the subject matter of Example 4 can optionally include wherein the one or more processors are configured to transmit or trigger transmission of the transmission request rejection according to the rejection strategy by selecting a quantity of transmission requests on the shared channel according to the rejection percentage, and triggering or triggering transmission of the transmission request rejection in response to the transmission request if the transmission request is one of the quantity of transmission requests selected according to the rejection percentage.

In Example 6, the subject matter of Example 5 can optionally include wherein the one or more processors are configured to select the quantity of transmission requests by randomly selecting a percentage of transmission requests equal to the rejection percentage over a period of time to obtain quantity of transmission requests.

In Example 7, the subject matter of any one of Examples 1 to 3 can optionally include wherein the one or more processors are configured to determine the rejection strategy for managing contention-based access to the shared channel by assigning a first set of the one or more transmitters to first group and assigning a second set of the one or more transmitters to a second group, and assigning the first group with a first set of timing resources during which the first group is permitted to access the channel and assigning the second group with a second set of timing resources with which the second group is permitted to access the channel.

In Example 8, the subject matter of Example 7 can optionally include wherein the one or more processors are configured to transmit or trigger transmission of the transmission request rejection in response to the transmission request by the first transmitter by determining that the transmission request by the first transmitter did not occur during the first set of timing resources, and transmitting or triggering transmission of the transmission request rejection based on the transmission request not occurring during the first set of timing resources.

In Example 9, the subject matter of any one of Examples 1 to 3 can optionally include wherein the one or more processors are configured to determine the rejection strategy for managing contention-based access to the shared channel by identifying a first set of the one or more transmitters that have a higher channel occupancy rate than a second set of the one or more transmitters.

In Example 10, the subject matter of Example 9 can optionally include wherein the one or more processors are configured to transmit or trigger transmission of the transmission request rejection in response to the transmission request by the first transmitter by determining that the first transmitter is in the first set of the one or more transmitters, and transmitting or triggering transmission of the transmission request rejection based on the first transmitter being in the first set of the one or more transmitters.

In Example 11, the subject matter of any one of Examples 1 to 10 can optionally include wherein the control node is connected to a local control node via a communication interface, and wherein the one or more processors are configured to transmit or trigger transmission of the transmission request rejection by instructing the local control node to transmit the transmission request rejection on the shared channel.

In Example 12, the subject matter of Example 11 can optionally include wherein the local control node is a network access node.

In Example 13, the subject matter of any one of Examples 1 to 12 can optionally include wherein the one or more processors are further configured to receive notifications from one or more local control nodes or one or more network access nodes that that indicate detection of the transmission request.

In Example 14, the subject matter of any one of Examples 1 to 13 can optionally include wherein the one or more processors are configured to determine the rejection strategy to manage contention-based access to the shared channel based on determining a metric that quantifies a level of congestion or collisions of the shared channel.

In Example 15, the subject matter of any one of Examples 1 to 10 can optionally include wherein the control node is a local control node with a connection to a central control node, wherein the one or more processors are configured to determine the rejection strategy for managing contention-based access to the shared channel by receiving an objective or an instruction from the central control node and determining the rejection strategy based on the objective or the instruction.

In Example 16, the subject matter of any one of Examples 1 to 10 can optionally include wherein the one or more processors are further configured to detect the transmission request by the first transmitter on the shared channel.

In Example 17, the subject matter of Example 16 can optionally include wherein the one or more processors are configured to detect the transmission request by the first transmitter on the shared channel based on input received from one or more sensors of a sensor network.

In Example 18, the subject matter of Example 16 can optionally further include an antenna and radio transceiver circuitry, wherein the one or more processors are configured to detect the transmission request by the first transmitter on the shared channel based on radio signals received via the antenna and the radio transceiver circuitry.

In Example 19, the subject matter of any one of Examples 1 to 10 can optionally further include an antenna and radio transceiver circuitry, wherein the one or more processors are configured to transmit the transmission request rejection on the shared channel with the antenna and the radio transceiver circuitry in response to the transmission request by the first transmitter.

In Example 20, the subject matter of any one of Examples 1 to 19 can optionally include wherein the control node is a Spectrum Access System (SAS) controller and the one or more transmitters are transmitters of one or more General Authorized Access (GAA) networks.

In Example 21, the subject matter of any one of Examples 1 to 20 can optionally include wherein the transmission request rejections overrule the transmission requests.

Example 22 is a central control node for managing channel access in a shared spectrum network that is shared at least between an incumbent network and a licensee network, the central control node including one or more processors configured to execute program code to transmit and receive signaling with one or more local control nodes to determine a rejection strategy for managing contention-based access to the shared channel, and communicate with the one or more local control nodes to implement the rejection strategy through the transmission of transmission request rejections in response to transmission requests by transmitters on the shared channel.

In Example 23, the subject matter of Example 22 can optionally be configured as a Spectrum Access System (SAS) controller and wherein the transmitters are transmitters of one or more General Authorized Access (GAA) networks.

In Example 24, the subject matter of Example 22 or 23 can optionally include wherein the one or more processors are configured to transmit and receive signaling with the one or more local control nodes to determine the rejection strategy by transmitting an objective, an instruction, or a description of the rejection strategy to the one or more local control nodes.

In Example 25, the subject matter of Example 24 can optionally include wherein the objective specifies a target collision probability for transmission on the shared channel.

In Example 26, the subject matter of Example 24 can optionally include wherein the one or more processors are configured to communicate with the one or more local control nodes to implement the rejection strategy through the transmission of transmission request rejections in response to transmission requests by transmitters on the shared channel by receiving a notification from the one or more local control nodes that a transmission request by a first transmitter is detected, determining that the transmission request be rejected according to the rejection strategy, and transmitting an instruction to a first local control node that instructs the first local control node to transmit a transmission request rejection in response to the transmission request.

In Example 27, the subject matter of any one of Examples 22 to 26 can optionally include wherein the one or more processors are configured to transmit and receive signaling with one or more local control nodes to determine the rejection strategy for managing contention-based access to the shared channel by receiving information from the one or more local control nodes that indicate congestion or collision conditions of the shared channel.

In Example 28, the subject matter of any one of Examples 22 to 27 can optionally include wherein the one or more local control nodes are network access nodes.

In Example 29, the subject matter of any one of Examples 22 to 28 can optionally include wherein the rejection strategy is for managing contention-based access to the shared channel according to a listen-before-talk access scheme.

In Example 30, the subject matter of any one of Examples 22 to 28 can optionally include wherein the rejection strategy is for managing contention-based access to the shared channel according to a Carrier Sense Multiple Access with Collision Avoidance (CSMA/CA) access scheme.

In Example 31, the subject matter of any one of Examples 22 to 30 can optionally include wherein the transmission requests are Requests to Send (RTSs).

In Example 32, the subject matter of any one of Examples 22 to 31 can optionally include wherein the transmission request rejections overrule transmission grants.

Example 33 is a method of managing access to shared channels in a wireless network, the method including determining a rejection strategy for managing contention-based access to a shared channel by one or more transmitters, and transmitting or triggering transmission of a transmission request rejection in response to a transmission request by a first transmitter of the one or more transmitters according to the rejection strategy.

In Example 34, the subject matter of Example 33 can optionally include wherein the rejection strategy is for managing contention-based access to the shared channel according to a listen-before-talk access scheme.

In Example 35, the subject matter of Example 33 can optionally include wherein the rejection strategy is for managing contention-based access to the shared channel according to a Carrier Sense Multiple Access with Collision Avoidance (CSMA/CA) access scheme.

In Example 36, the subject matter of any one of Examples 33 to 35 can optionally include wherein determining the rejection strategy for managing contention-based access to the shared channel includes determining a current collision probability of transmission on the shared channel that is higher than a target collision probability, and determining a rejection percentage that specifies a percentage of transmission requests for the shared channel to be rejected.

In Example 37, the subject matter of Example 36 can optionally include wherein transmitting or triggering transmission of the transmission request rejection according to the rejection strategy includes selecting a quantity of transmission requests on the shared channel according to the rejection percentage, and triggering or triggering transmission of the transmission request rejection in response to the transmission request if the transmission request is one of the quantity of transmission requests selected according to the rejection percentage.

In Example 38, the subject matter of Example 37 can optionally include wherein selecting the quantity of transmission requests includes randomly selecting a percentage of transmission requests equal to the rejection percentage over a period of time to obtain the quantity of transmission requests.

In Example 39, the subject matter of any one of Examples 33 to 35 can optionally include wherein determining the rejection strategy for managing contention-based access to the shared channel includes assigning a first set of the one or more transmitters to first group and assigning a second set of the one or more transmitters to a second group, and assigning the first group with a first set of timing resources during which the first group is permitted to access the channel and assigning the second group with a second set of timing resources with which the second group is permitted to access the channel.

In Example 40, the subject matter of Example 39 can optionally include wherein transmitting or triggering transmission of the transmission request rejection in response to the transmission request by the first transmitter includes determining that the transmission request by the first transmitter did not occur during the first set of timing resources, and transmitting or triggering transmission of the transmission request rejection based on the transmission request not occurring during the first set of timing resources.

In Example 41, the subject matter of any one of Examples 33 to 35 can optionally include wherein determining the rejection strategy for managing contention-based access to the shared channel includes identifying a first set of the one or more transmitters that have a higher channel occupancy rate than a second set of the one or more transmitters.

In Example 42, the subject matter of Example 41 can optionally include wherein transmitting or triggering transmission of the transmission request rejection in response to the transmission request by the first transmitter includes determining that the first transmitter is in the first set of the one or more transmitters, and transmitting or triggering transmission of the transmission request rejection based on the first transmitter being in the first set of the one or more transmitters.

In Example 43, the subject matter of any one of Examples 33 to 42 can optionally include wherein transmitting or triggering transmission of the transmission request rejection includes instructing a local control node to transmit the transmission request rejection on the shared channel.

In Example 44, the subject matter of Example 43 can optionally include wherein the local control node is a network access node.

In Example 45, the subject matter of any one of Examples 33 to 44 can optionally further include receiving notifications from one or more local control nodes or one or more network access nodes that that indicate detection of the transmission request.

In Example 46, the subject matter of any one of Examples 33 to 45 can optionally include wherein determining the rejection strategy to manage contention-based access to the shared channel includes determining the rejection strategy based on determining a metric that quantifies a level of congestion or collisions of the shared channel.

In Example 47, the subject matter of any one of Examples 33 to 42 can optionally include wherein determining the rejection strategy for managing contention-based access to the shared channel includes receiving an objective or an instruction from a central control node and determining the rejection strategy based on the objective or the instruction.

In Example 48, the subject matter of any one of Examples 33 to 42 can optionally further include detecting the transmission request by the first transmitter on the shared channel.

In Example 49, the subject matter of Example 48 can optionally include wherein detecting the transmission request by the first transmitter on the shared channel includes detecting the transmission request based on input received from one or more sensors of a sensor network.

In Example 50, the subject matter of Example 49 can optionally include wherein detecting the transmission request includes detecting the transmission request via an antenna and radio transceiver circuitry.

In Example 51, the subject matter of any one of Examples 33 to 42 can optionally include wherein transmitting or triggering transmission of the transmission request rejection includes transmitting the transmission request rejection on the shared channel with an antenna and radio transceiver circuitry.

In Example 52, the subject matter of any one of Examples 33 to 51 can optionally include wherein the method is executed at a Spectrum Access System (SAS) controller and the one or more transmitters are transmitters of one or more General Authorized Access (GAA) networks.

In Example 53, the subject matter of any one of Examples 33 to 52 can optionally include wherein the transmission request rejections overrule the transmission requests.

Example 54 is a non-transitory computer readable medium storing instructions that when executed by a processor cause the processor to perform the method of any one of Examples 33 to 53.

Example 55 is a non-transitory computer readable medium storing instructions that when executed by a controller of a control node cause the control node to perform the method of any one of Examples 33 to 53.

Example 56 is a method of managing channel access in a shared spectrum network that is shared at least between an incumbent network and a licensee network, the method including transmitting and receiving signaling with one or more local control nodes to determine a rejection strategy for managing contention-based access to the shared channel, and communicating with the one or more local control nodes to implement the rejection strategy through the transmission of transmission request rejections in response to transmission requests by transmitters on the shared channel.

In Example 57, the subject matter of Example 56 can optionally include wherein the method is executed at a Spectrum Access System (SAS) controller and the one or more transmitters are transmitters of one or more General Authorized Access (GAA) networks.

In Example 58, the subject matter of Example 56 or 57 can optionally include wherein transmitting and receiving signaling with the one or more local control nodes to determine the rejection strategy includes transmitting an objective, an instruction, or a description of the rejection strategy to the one or more local control nodes.

In Example 59, the subject matter of Example 58 can optionally include wherein the objective specifies a target collision probability for transmission on the shared channel.

In Example 60, the subject matter of Example 58 can optionally include wherein communicating with the one or more local control nodes to implement the rejection strategy through the transmission of transmission request rejections in response to transmission requests by transmitters on the shared channel includes receiving a notification from the one or more local control nodes that a transmission request by a first transmitter is detected, determining that the transmission request be rejected according to the rejection strategy, and transmitting an instruction to a first local control node that instructs the first local control node to transmit a transmission request rejection in response to the transmission request.

In Example 61, the subject matter of any one of Examples 56 to 60 can optionally include wherein transmitting and receiving signaling with one or more local control nodes to determine the rejection strategy for managing contention-based access to the shared channel includes receiving information from the one or more local control nodes that indicate congestion or collision conditions of the shared channel.

In Example 62, the subject matter of any one of Examples 56 to 61 can optionally include wherein the one or more local control nodes are network access nodes.

In Example 63, the subject matter of any one of Examples 56 to 62 can optionally include wherein the rejection strategy is for managing contention-based access to the shared channel according to a listen-before-talk access scheme.

In Example 64, the subject matter of any one of Examples 56 to 62 can optionally include wherein the rejection strategy is for managing contention-based access to the shared channel according to a Carrier Sense Multiple Access with Collision Avoidance (CSMA/CA) access scheme.

In Example 65, the subject matter of any one of Examples 56 to 64 can optionally include wherein the transmission requests are Requests to Send (RTSs).

In Example 66, the subject matter of any one of Examples 56 to 65 can optionally include wherein the transmission request rejections overrule transmission grants.

Example 67 is a non-transitory computer readable medium storing instructions that when executed by a processor cause the processor to perform the method of any one of Examples 56 to 66.

Example 68 is a non-transitory computer readable medium storing instructions that when executed by a controller of a control node cause the control node to perform the method of any one of Examples 56 to 66.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A control node for operating in a network with shared channels, the control node comprising:
    one or more processors configured to execute program code to:
        determine a rejection strategy for managing contention-based access to a shared channel by one or more transmitters;
        transmit or trigger transmission of a transmission request rejection in response to a transmission request by a first transmitter of the one or more transmitters according to the rejection strategy,
        wherein the transmission request rejection overrules any transmission grants previously transmitted by another entity in response to the transmission request.

2. The control node of claim 1, wherein the rejection strategy is for managing contention-based access to the shared channel according to a Carrier Sense Multiple Access with Collision Avoidance (CSMA/CA) access scheme.

3. The control node of claim 1, wherein the control node is connected to a local control node via a communication interface, and wherein the one or more processors are configured to transmit or trigger transmission of the transmission request rejection by:
    instructing the local control node to transmit the transmission request rejection on the shared channel.

4. The control node of claim 3, wherein the local control node is a network access node.

5. The control node of claim 1, wherein the one or more processors are further configured to:
    receive notifications from one or more local control nodes or one or more network access nodes that that indicate detection of the transmission request.

6. The control node of claim 1, wherein the control node is a local control node with a connection to a central control node,
    wherein the one or more processors are configured to determine the rejection strategy for managing contention-based access to the shared channel by receiving an objective or an instruction from the central control node and determining the rejection strategy based on the objective or the instruction.

7. The control node of claim 1, wherein the one or more processors are further configured to:
    detect the transmission request by the first transmitter on the shared channel.

8. The control node of claim 7, wherein the one or more processors are configured to detect the transmission request by the first transmitter on the shared channel based on input received from one or more sensors of a sensor network.

9. The control node of claim 7, further comprising an antenna and radio transceiver circuitry, wherein the one or more processors are configured to detect the transmission request by the first transmitter on the shared channel based on radio signals received via the antenna and the radio transceiver circuitry.

10. The control node of claim 1, further comprising an antenna and radio transceiver circuitry, wherein the one or more processors are configured to transmit the transmission request rejection on the shared channel with the antenna and the radio transceiver circuitry in response to the transmission request by the first transmitter.

11. The control node of claim 1, wherein the control node is a Spectrum Access System (SAS) controller and the one or more transmitters are transmitters of one or more General Authorized Access (GAA) networks.

12. A method of managing access to shared channels in a wireless network, the method comprising:
    determining a rejection strategy for managing contention-based access to a shared channel by one or more transmitters; and transmitting or triggering transmission of a transmission request rejection in response to a transmission request by a first transmitter of the one or more transmitters according to the rejection strategy,
wherein the transmission request rejection overrules any transmission grants previously transmitted by another entity in response to the transmission request.

13. The method of claim 12, wherein the rejection strategy is for managing contention-based access to the shared channel according to a Carrier Sense Multiple Access with Collision Avoidance (CSMA/CA) access scheme.

14. The method of claim 12, wherein transmitting or triggering transmission of the transmission request rejection comprises:
instructing a local control node to transmit the transmission request rejection on the shared channel.

15. The method of claim 14, wherein the local control node is a network access node.

16. The method of claim 12, further comprising:
receiving notifications from one or more local control nodes or one or more network access nodes that that indicate detection of the transmission request.

17. A central control node for managing channel access in a shared spectrum network that is shared at least between an incumbent network and a licensee network, the central control node comprising:
one or more processors configured to execute program code to:
transmit and receive signaling with one or more local control nodes to determine a rejection strategy for managing contention-based access to the shared channel; and
communicate with the one or more local control nodes to implement the rejection strategy through the transmission of transmission request rejections in response to transmission requests by transmitters on the shared channel,
wherein the transmission request rejection overrules any transmission grants previously transmitted by the one or more local nodes.

18. The central control node of claim 17, configured as a Spectrum Access System (SAS) controller and wherein the transmitters are transmitters of one or more General Authorized Access (GAA) networks.

19. The central control node of claim 17, wherein the one or more processors are configured to transmit and receive signaling with the one or more local control nodes to determine the rejection strategy by:
transmitting an objective, an instruction, or a description of the rejection strategy to the one or more local control nodes.

* * * * *